United States Patent [19]
Kilkki et al.

[11] Patent Number: 6,081,843
[45] Date of Patent: Jun. 27, 2000

[54] SYSTEM USING SIMULATION CELL AND SIMULATION BUFFER FOR REGULATING CELL TRANSFER RATE ACCORDING TO OCCUPANCY LEVEL OF THE SIMULATION BUFFER

[75] Inventors: Matti Kalevi Kilkki; Sari Irene Saranka, both of Espoo, Finland

[73] Assignee: Nokia Telecommunications, Espoo, Finland

[21] Appl. No.: 08/821,238

[22] Filed: Mar. 20, 1997

[51] Int. Cl.[7] .................................................. G06F 15/16
[52] U.S. Cl. ........................ 709/232; 709/233; 709/234
[58] Field of Search ................................. 709/234, 232, 709/233; 370/236, 230, 468, 412, 231

[56] References Cited

U.S. PATENT DOCUMENTS

| | | | |
|---|---|---|---|
| 5,042,029 | 8/1991 | Hayakawa | 370/231 |
| 5,313,454 | 5/1994 | Bustini et al. | 370/231 |
| 5,546,389 | 8/1996 | Wippenbeck et al. | 370/412 |
| 5,838,663 | 11/1998 | Elwalid et al. | 370/233 |
| 5,889,761 | 3/1999 | Yamato | 370/231 |
| 5,898,670 | 4/1999 | Hoebeke et al. | 370/468 |
| 5,909,443 | 6/1999 | Fichou et al. | 370/412 |
| 5,910,942 | 6/1999 | Grenot et al. | 370/236 |
| 5,926,459 | 7/1999 | Lyles et al. | 370/230 |
| 5,935,213 | 8/1999 | Rananand et al. | 709/234 |

FOREIGN PATENT DOCUMENTS

| | | |
|---|---|---|
| 0743803 A2 | 11/1996 | European Pat. Off. . |
| 0805578 A2 | 11/1997 | European Pat. Off. . |

OTHER PUBLICATIONS

Technical Committee, Traffic Management Specification Version 4.0, af–tm–00561.000, Apr. 1996, pp. 1–59.
Integrated Services Digital Network (ISDN) Overall Network Aspects and Functions, Traffic Control and Congestion Control in B–ISDN, ITU–T Recommendation 1.371, Mar. 1993, pp. 1–27.
What are the meaning of CBR, VBR, ABR, UBR?, Maintained by Carl Symborski, Last Changed Aug. 10, 1996, pp. 1–2 and 1–5.
ATM Service Categories: The Benefits to the User, Editor: Libio Lambaarelli, CSELT' Torino, Italy, pp. 1–10.
An Overview of ATM Technology, Gary Kessler, Jan. 1995, pp. 1–10.
ATM—The New Technology for Tomorrow's B–ISDN, Engui Yao, Dec. 1994, pp. 1–23.

*Primary Examiner*—Le Hien Luu
*Attorney, Agent, or Firm*—Altera Law Group LLC

[57] ABSTRACT

A system and method for regulating the cell transfer rate over a network in response to priority level feedback. The feedback feature provides network connection availability information corresponding to a level of bandwidth available on the network connection to the cell source. The connection availability information is converted into a buffer occupancy level accessible at the cell source. The cell transfer rate is regulated at the network source unit in accordance with the buffer occupancy level, including decreasing the cell transfer rate when the buffer occupancy level rises above a high occupancy threshold of the buffer, and increasing the cell transfer rate when the buffer occupancy level drops below a low occupancy threshold of the buffer.

20 Claims, 14 Drawing Sheets

SYSTEM USING SIMULATION CELL AND SIMULATION BUFFER FOR REGULATING CELL TRANSFER RATE ACCORDING TO OCCUPANCY LEVEL OF THE SIMULATION BUFFER

FIELD OF THE INVENTION

The present invention relates generally to communications systems, and more particularly, to a system and method for optimizing information transfers over a network through the utilization of network load feedback.

BACKGROUND OF THE INVENTION

The state of communications technology, particularly that which affects the Internet, is currently in flux and subject to rapid and often uncoordinated growth. The ubiquity and variety of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification referenced hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VER service categories are characterized in terms of a peak cell rate (PCR), a sustainable cell rate (SCR), and a maximum burst size (MBS).

The unspecified bit rate (ABR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

One significant network traffic consideration is the amount of currently available bandwidth on a particular virtual connection. Except for the ABR service category, the existing ATM service classes do not suggest utilizing this network load information. The ABR service category provides for dynamic allocation of available bandwidth in response to network load information returned to the user.

However, the ABR service class provides a complex arrangement of feedback information, including a current cell rate, explicit rate, minimum cell rate, direction indication, congestion indication, as well as others. This complex arrangement increases the complexity of the service class architecture. Also, the feedback mechanism defined for the ABR service class provides for allocation of bandwidth bounded between a defined minimum cell rate and a peak cell rate. Therefore, cell rate guarantees continue to exist which increases the complexity of the traffic management scheme. Furthermore, the conventional ATM service classes, including the ABR service class, do not provide solutions for determining network load conditions, and effectively managing cell transfer rates at the source unit in accordance with those network load conditions.

Accordingly, there is a need in the communications industry for a network arrangement and method that is not conceptually complicated to implement, and that provides network capacity division during bandwidth overload situations, while providing network load information to the user with minimal complexity and negligible delays. A further need exists for a system and method for efficiently regulating the cell transfer rate at the network source unit in response to the network load information. The present invention fulfills these and other needs, and offers other advantages over the prior art traffic management approaches.

SUMMARY OF THE INVENTION

The present invention is directed to a system and method for regulating the cell transfer rate over a network in response to priority level feedback. Network load information is provided to a network information source having a quality of service based on a nominal bit rate (NBR) service category. A nominal bit rate represents an expected, but not guaranteed, bit rate associated with a particular user or connection. Information elements transmitted from the sourcing unit to a network node are each assigned one of several priority levels. The priority feedback information in the NBR system is provided to the cell source to allow regulation of the priority levels. The present invention provides for regulation of the cell transfer rate of cells output from the cell source in response to the priority feedback information.

In accordance with one embodiment of the invention, the feedback feature provides network connection availability information corresponding to a level of bandwidth available on the ne work connection to the cell source. The connection availability information is converted into a buffer occupancy level accessible at the cell source. The cell transfer rate is regulated at the network source unit in accordance with the buffer occupancy level. In one embodiment, the cell transfer rate is decreased when the buffer occupancy level rises above a high occupancy threshold of the buffer, and the cell transfer rate is alternatively increased when the buffer occupancy level drops below a low occupancy threshold of the buffer.

In accordance with another embodiment of the invention, a status cell is sent through the network connection to the destination, and returned to the cell source with the network connection availability information. An acceptable priority field in the status cell is updated to reflect the minimum of the requisite cell priorities of the nodes as the nodes are reached by the status cell. When the status cell reaches the destination, the value of the acceptable priority field is stored in the status cell to be returned to the cell source. The cell source analyzes the acceptable priority in the status cell, and adjusts the priority level of subsequently output cells in response thereto.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

DETAILED DESCRIPTION OF THE ILLUSTRATED EMBODIMENTS

Figure 1:
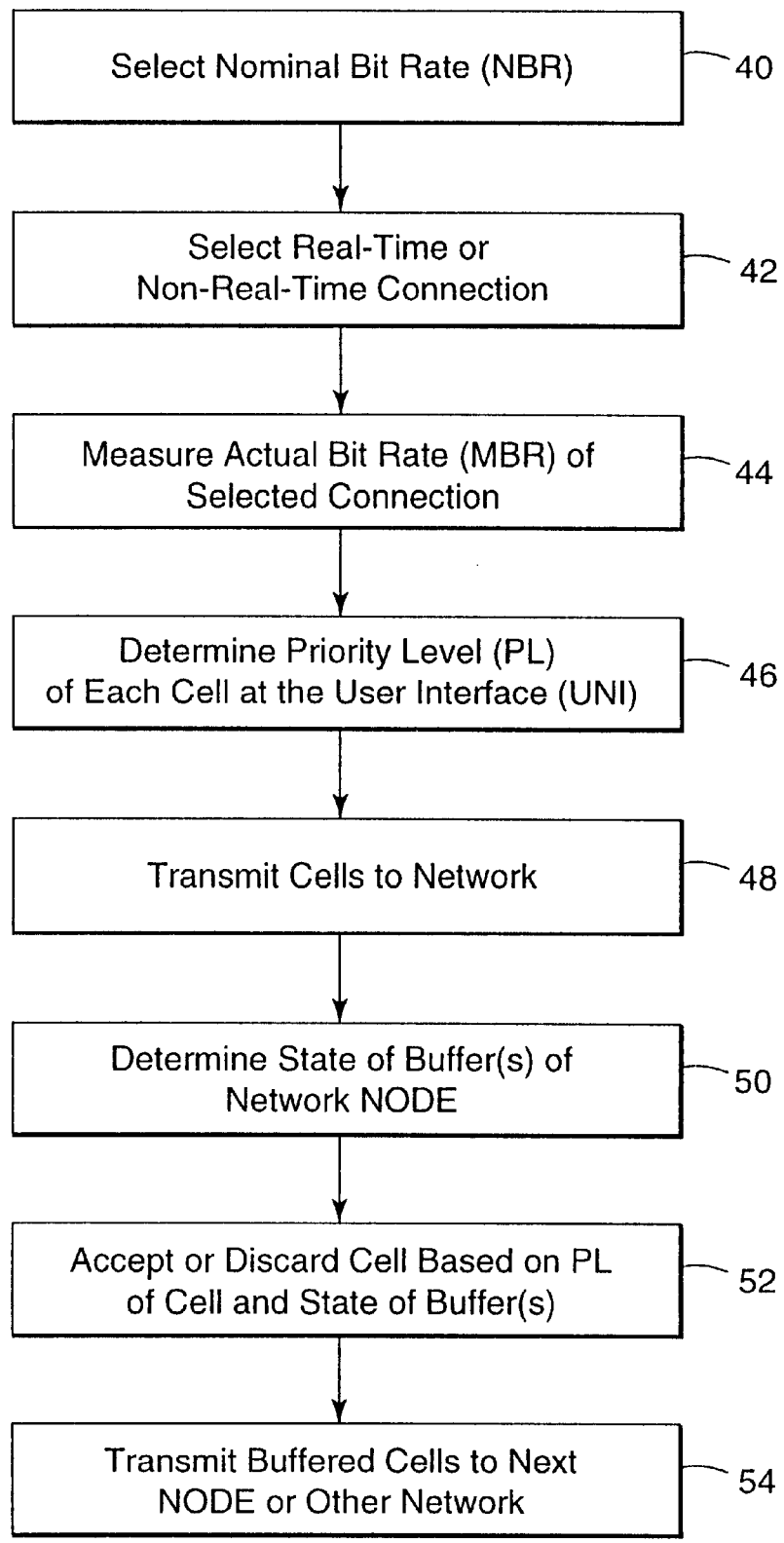
FIG. 1 is a flow diagram illustrating a general procedure for communicating cells of information between a user/network interface and a network using a nominal bit rate service in accordance with an embodiment of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The service concept described herein may be viewed as a Simple Integrated Media Access (SIMA) service model. The SIMA service model incorporates the basic properties of ATM with the addition of eight priority levels as defined within the context of a new service concept termed a nominal bit rate (NBR) service. In general, the NBR service provides for the simple and efficient division of network capacity amongst different connections and the charging of user fees for the use of such connections. A network that embraces a basic version of the SIMA service model does not need to perform many of the traditional and burdensome traffic management functions involving traffic descriptors, quality of service parameters, service classes, connection admission control (CAC), or usage parameter control (UPC).

All of these functions are effectively replaced by functions performed by two autonomous units: a measuring unit, provided at a user/network interface, and a cell scheduling and buffering unit, provided at a network node. The SIMA service concept, from a user's perspective, is simple and understandable, because there are no pre-defined traffic or quality parameters associated with each connection, and charging for connection usage is based solely on the value of NBR and the duration of the connection.

A typical implementation of a SIMA service utilizes two primary components: access nodes and core network nodes, which have fundamentally different functional responsibilities. For example, access nodes, which may be a user/network interface, perform the task of measuring traffic for every connection, whereas at the core network nodes, the traffic control functions do not need to know anything about the properties of individual connections.

The elegant simplicity of the SIMA service model offers obvious advantages to the manufacturers of infrastructure hardware and software. For example, ATM switches or crossconnects can be built using individual cell scheduling and buffering units, switching fabrics, and routing functions. By using ATM virtual paths or IP switching technology, the routing tasks may be reduced in complexity. In addition, packet discarding and priority feedback features may be included in the cell scheduling and buffering units without negatively impacting their automaticity. Also, simple implementation of network nodes may result in the availability of a relatively inexpensive, high capacity network infrastructure.

The more complex unit of the SIMA service infrastructure concerns the access nodes. Such access nodes will typically include a measuring unit to measure the traffic stream of every connection in real-time, and a computation unit for determining a priority to be assigned to every cell. These additional features should be implementable at a level of difficulty no greater than that for effecting UPC in conventional ATM networks.

The present invention provides for regulation of the cell transfer rate from a cell-sourcing unit in an NBR system as disclosed herein. Regulation of the cell transfer rate allows for the realization of acceptable cell loss probabilities. Information regarding the connection threshold level is periodically updated and fed back to the cell-sourcing unit. Each ATM node calculates a typical allowable priority level that can be inserted into special status cells used by the source to probe the connection. The typical allowable priority level of the nodes is then used to optimize the cell transfer rate according to the connection availability.

In one embodiment of the invention, the feedback feature is used to optimize the cell transfer rate by maintaining the highest priority possible without exceeding the worst-case allowable priority accepted at the nodes of the virtual connection. The invention, therefore, provides priority level feedback ($PL_{tb}$) which informs the cell source of a typical priority level that is still accepted by the nodes of a connection.

The cell source is directed to increase or decrease the cell transfer rate in accordance with a measurement device at the UNI. In one embodiment, this measurement device is a buffer which is filled with "virtual cells" as cells are output from the cell source. The buffer is emptied by removing the virtual cells from the buffer at a rate corresponding to the availability of the connection. As the cell transfer rate increases, the buffer becomes more filled. The buffer discharges virtual cells at an increasing rate as the status cells return priority level feedback information indicative of greater network availability. When the buffer occupancy level falls below a predefined threshold value, a signal is sent to the cell output source to increase its output cell rate. Conversely, when the buffer occupancy level rises above a predefined threshold value, a signal is sent to the cell output source to decrease its output cell rate.

Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate (MBR) of the selected real-time or non-real-time connection at the UNI. The priority level of each cell is determined 46 at the UNI using a ratio of the MBR and the NBR.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
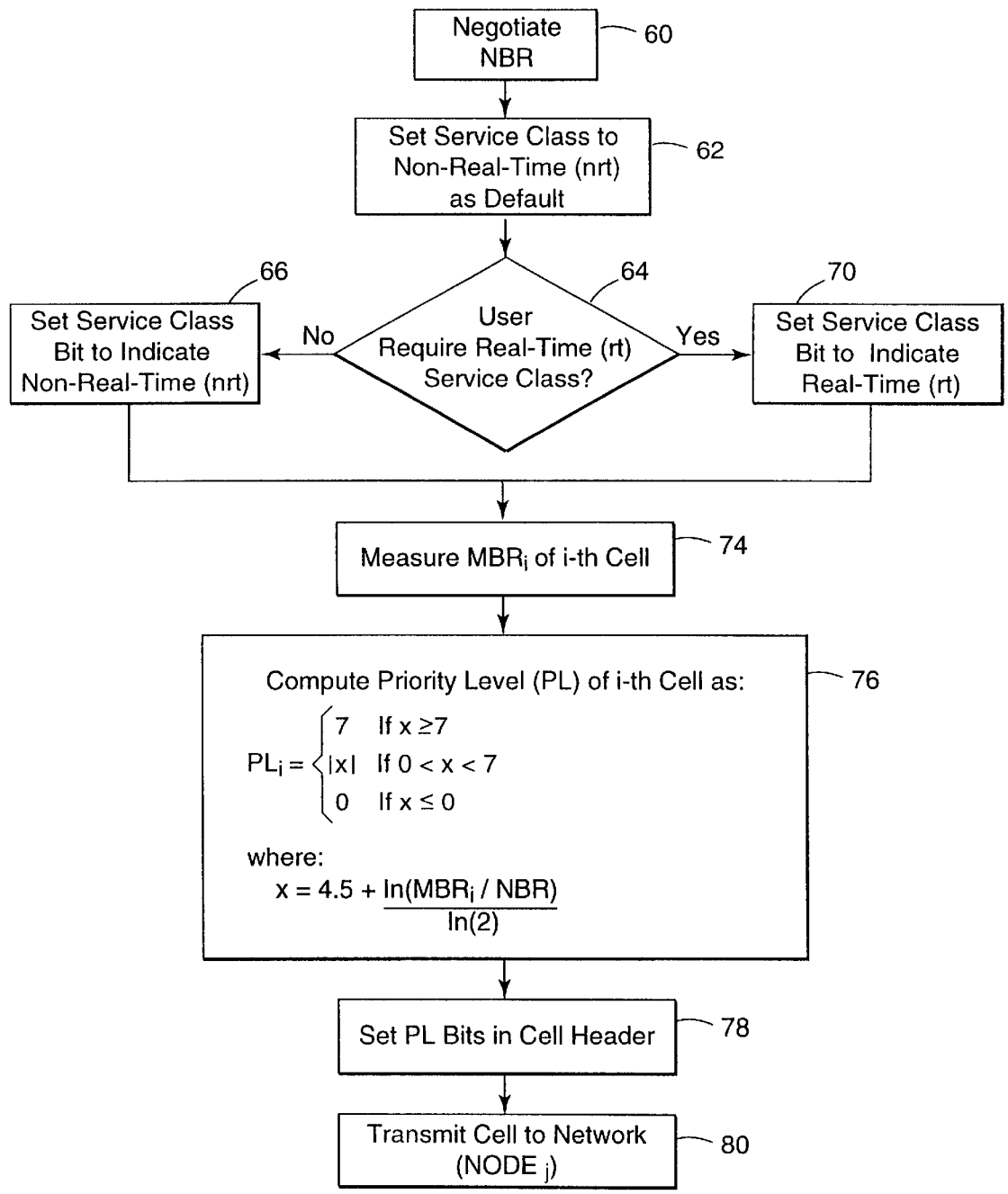
FIG. 2 illustrates in greater detail a procedure for transmitting cells of information between a user/network interface and a network using a nominal bit rate service in accordance with another embodiment of the present invention.
Figure 3:
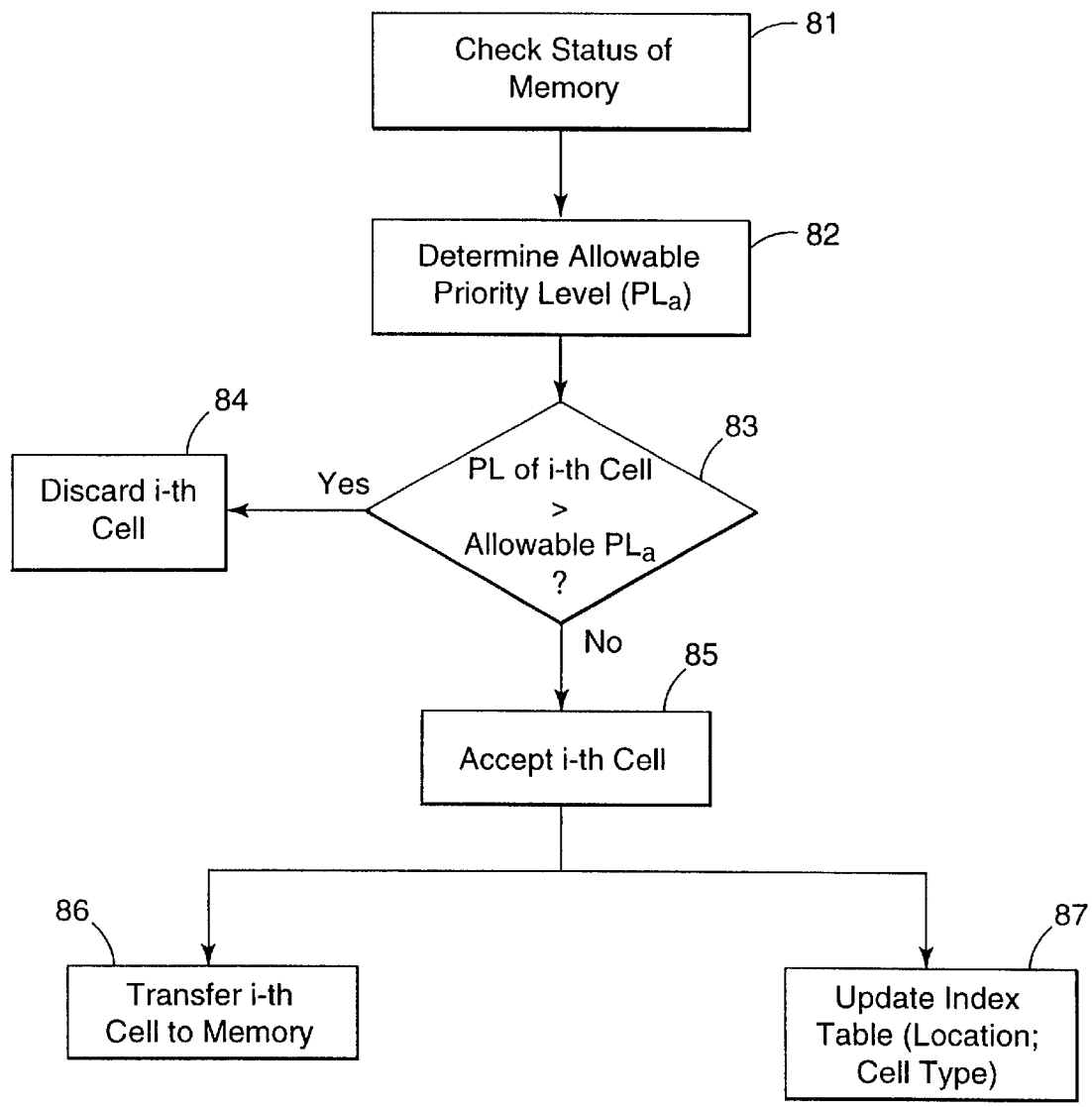
FIG. 3 illustrates in flow diagram form a general procedure for filtering cells at a network node in accordance with an embodiment of a nominal bit rate service.
Figure 4:
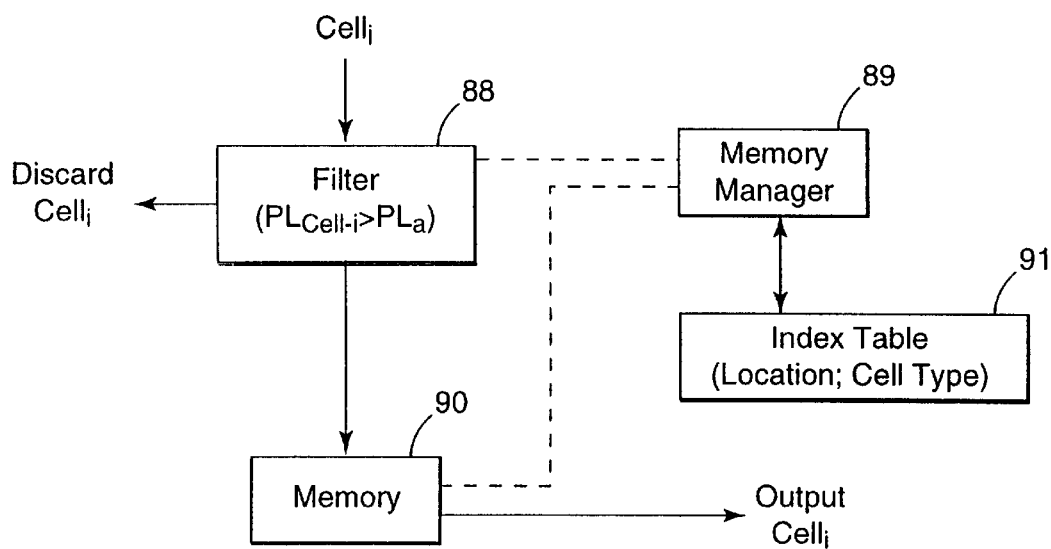
FIG. 4 is a block diagram of an embodiment of a system for filtering cells at a network node in accordance a nominal bit rate service.

FIGS. 2–4 illustrate a procedure for scheduling and buffering cells in accordance with one embodiment of an NBR service methodology. Referring now to FIG. 2, a user establishes 60 an NBR with a network operator. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 74. Since, in practice, the actual bit rate may be subject to significant variability over time, a measuring unit of the UNI employs an averaging measuring principle to determine the actual or instantaneous bit rate, $MBR^i$.

In general, the UNI measures 74 the actual bit rate of a cell, such as $cell_i$, by approximating the actual or instantaneous bit rate of the connection within a measuring period having a duration that is appropriate for the particular connection (e.g., a real-time or non-real-time connection). The instantaneous bit rate, $MBR_i$, may be determined using a known technique.

Having determined 74 the measured bit rate, $MBR_i$, of the i:th cell, the priority level of the i:th cell is computed using the measured bit rate, $MBR_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n\text{-}bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 76 the priority level of each cell, such as $cell_i$, using the computed value of $MBR_i$ and the value of NBR. In accordance with one embodiment of the present invention, and assuming that the measured bit rate is $MBR_i$ when the i:th cell is transmitted to the network, the priority level ($PL_i$) of $cell_i$ may be calculated using the following equation:

$$x = 4.5 + \frac{\ln(MBR_i / NBR)}{\ln(2)} \quad [1]$$

$$PL_i = \begin{cases} 7 & \text{if } x \geq 7 \\ \lfloor x \rfloor & \text{if } 0 < x < 7, \\ 0 & \text{if } x \leq 0 \end{cases}$$

where, $\lfloor x \rfloor$ represents the integer part of x. As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\lfloor x \rfloor$ represents the integer part of x, if 1<x<7.

It can be seen by applications of Equation [1] above that if a connection is exploiting network capacity in excess to the connection's negotiated NBR value, the priority level of $cell_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 78 for each ATM cell transferred from the UNI. The ATM cells are then transmitted 80 to targeted network nodes$_j$ identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 3, there is illustrated in flow diagram form a general methodology by which a network node processes cells containing priority level information received from a UNI in accordance with one embodiment of the present invention. FIG. 4 illustrates an embodiment of various components of a network node employed to effectuate the methodology illustrated in FIG. 3. It is assumed that a cell, such as $cell_i$, has been processed at a UNI and includes priority level information derived in a manner described hereinabove.

$Cell_i$ is transmitted from the UNI to a network node and is received at a filter 88 of the node. A memory manager 89 checks the status 81 of the memory 90 in order to determine the occupancy in the memory 90. The memory manager 89 determines 82 the allowable priority level ($PL_a$) based on the occupancy state of the memory 90. In general, the memory manager 89 establishes a high allowable priority which translates to a low allowable priority "level," for example $PL_a$=0 or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example $PL_a$=6 or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 83 by the memory manager 89, the filter 88 discards 84 $cell_i$. If, on the other hand, the priority level of $cell_i$ is equal to or less than the allowable priority level $PL_a$, the filter 88 accepts 85 $cell_i$. The memory manager 89 coordinates the transfer 86 of $cell_i$ to the memory 90 and updates an index table 91 coupled to the memory manager 89 to include a new index table entry for newly accepted $cell_i$. In one embodiment, the index table 91 stores the location of the accepted $cell_i$ in the memory 90, and also stores a cell-type indicator which specifies whether $cell_i$ is a real-time cell or a non-rear-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 5:
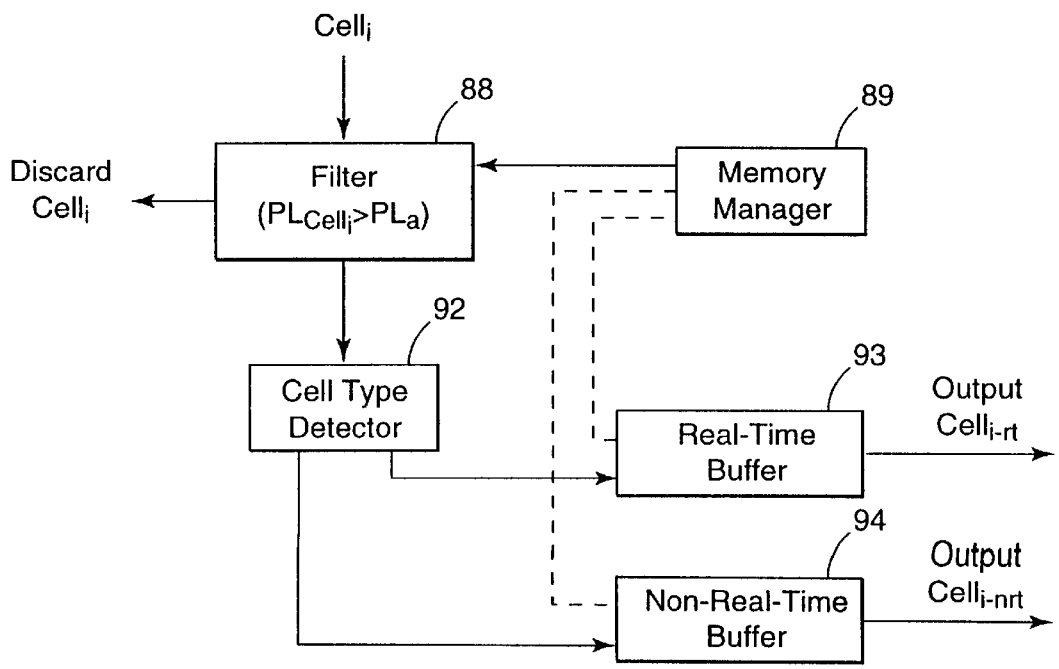
FIG. 5 is a block diagram of an alternative embodiment of a system for filtering cells at a network node in accordance with a nominal bit rate service.

In accordance with another embodiment, as is illustrated in FIG. 5, a memory manager 89 determines the status of a real-time buffer (rt-buffer) 93 and a non-real-time buffer (nrt-buffer) 94. The memory manager 89 determines, in a manner similar to that previously described, the allowable priority level, $PL_a$, for the filter 88 based on the status of the rt-buffer 93 and the nrt-buffer 94. If the priority level of $cell_i$ is greater than the allowable priority level, $PL_a$, the filter 88 discards $cell_i$. If, on the other hand, the priority level of $cell_i$ is equal to or less than the allowable priority level, $PL_a$, $cell_i$ is accepted.

In accordance with another embodiment, the network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers the $cell_i$ to either the rt-buffer 93 or the nrt-buffer 94. In a manner similar to that described previously with respect to FIGS. 3 and 4, the memory manager 89 coordinates the output of rt-cells and nrt-cells respectively from the rt-buffer 93 and the nrt-buffer 94, giving preference to the rt-cells.

In accordance with another embodiment of the present invention, it may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

In accordance with another embodiment of the present invention, a SIMA service model provides for the accommodation of both NBR and traditional ATM service connections. It is appreciated that traditional ATM services which offer guaranteed connections may be desirable for certain applications. It is anticipated, however, that the quality of service offered by the NBR service of the present invention will meet or exceed a user's expectations for virtually all real-time and non-real-time applications.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [1] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

A point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. It may be possible to utilize the current Generic Flow Control (GFC) field which constitutes a total of four bits. In this case, three bits may be allocated for designating cell priority level and one bit may be designated as the rt/nrt service class bit.

Figure 6:
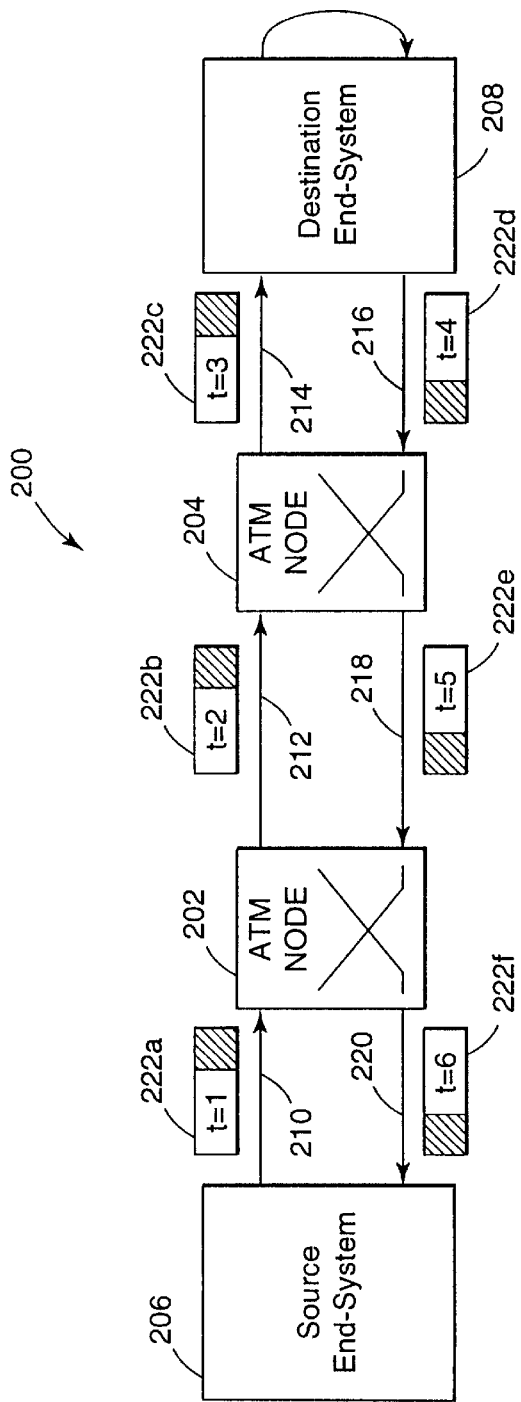
FIG. 6 is a block diagram illustrating one embodiment of an ATM network implementing the NBR methodology.

FIG. 6 is a block diagram illustrating one embodiment of an ATM network 200 implementing the NBR methodology. The exemplary ATM network 200 used for purposes of this description is depicted as a network having two intermediary ATM nodes 202 and 204. However, as will be appreciated by those skilled in the art, the present invention may likewise be implemented in various network structures such as multipoint, star, ring, loop and mesh network topologies used in networks ranging from local area networks (LAN) to proliferative global area networks (GAN) such as the Internet.

The network 200 includes a source end-system 206 for transmitting digital information to the destination end-system 208. The information transmitted in such a network typically passes through various network nodes, such as nodes 202 and 204, as it advances towards its destination. These nodes represent network data communications elements such as routers, switches or multiplexers. Connecting the end-systems and nodes are circuit connections that provide the means for which the digital information may be passed. Connection links 210, 212 and 214 represent the connections for data sent from the source end-system 206 to the destination 208, while connection links 216, 218 and 220 represent those connections which provide information in return.

FIG. 6 further illustrates an ATM cell flow in the ATM network 200 implementing the NBR methodology. As data is sent to the destination end-system 208 by way of a flow of ATM cells along connections 210, 212 and 214, network load information may be returned to the source end-system 206 via connections 216, 218 and 220. The NBR system operates on a priority basis, thereby resulting in the presentation of NBR network load information as priority level information. Information regarding current allowable priority levels at the nodes is provided to the source end-system 206 in order to provide status and allow optimization cf the cell transfer rate (CTR).

In one embodiment of the invention, the network load information is provided tc the source end-system 206 in the form of special ATM status cells periodically issued from the source end-system 206. The status cells are part of the normal connection cell flow in the sense that they are included in the normal MBR calculation of the connection, and the status cell priority level is calculated in the manner previously described in connection with FIG. 2. FIG. 6 illustrates the progress of a typical status cell in accordance with the present invention, seen at six different intervals as it advances from source end-system 206 to the destination end-system 208. The status cell 222a–f is depicted at times t=1 through t=6 respectively, which corresponds to the location/time relationship as the status cell traverses a connection.

Figure 7:
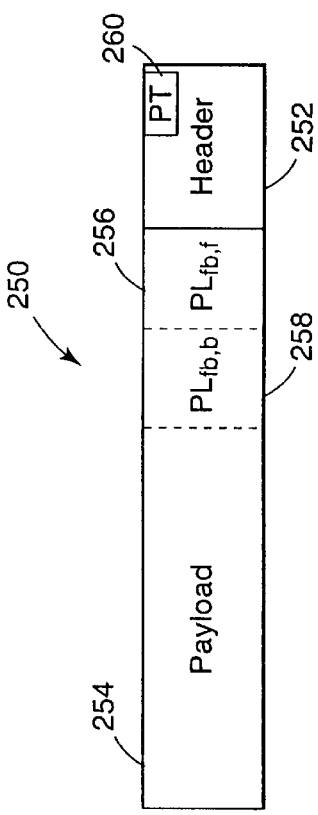
FIG. 7 illustrates one embodiment of a network load status cell in accordance with the NBR service of the present invention.

Referring now to FIG. 7, one embodiment of a network load status cell 250 in accordance with the present invention is shown. ATM standards define an ATM cell as a fixed-size cell with a length of 53 octets comprised of a 5-octet header and a 48-octet payload. The status cell 250 is modeled after the ATM standard cell, and includes a 5-octet header 252 and a 48-octet payload 254. Within the payload section 254 of the status cell 250 are a pair of priority level feedback ($PL_{fb}$) cells, labeled $PL_{fb,f}$ 256 (forward priority level feedback) and $PL_{fb,b}$ 258 (backwards priority level feedback), that are used to store priority level information as the status cell 250 travels from source-to-destination and destination-to-source respectively. The $PL_{fb,f}$ field 256 gathers the worst-case $PL_a$ on the connection identified by the value of the lowest allowable priority (i.e., the highest allowable priority "level", $PL_{fb}$) currently being accepted from the source to the destination. In one embodiment, the source end-system 206 initially sets the $PL_{fb,f}$ field 256 to the lowest priority, corresponding to a priority level value of "7".

As each node receives the status cell 250, it examines its current load level at the outgoing link of the connection. The load condition at a particular node is denoted $PL_{fb,n}$, which identifies the highest priority, and therefore the lowest allowable priority level $PL_a$, for the ATM node. The current load condition $PL_{fb,n}$ at the node is compared to the value available in the $PL_{fb,f}$ field 256, where the $PL_{fb,f}$ field 256 reflects the lowest allowable priority level $PL_a$, identified in a node on the connection. Where $PL_{fb,n} < PL_{fb,f}$, the value in the $PL_{fb,f}$ field 256 is decreased to reflect the lowest allowable priority level identified up to this point in the connection, and is therefore decremented to equal the $PL_a$ value of the node. Where $PL_{fb,f} > PL_{fb,f}$, the node does not change the value in the $PL_{fb,f}$ field 256.

Each network node detects the status cell 250 based on identifying information in the cell header 252. Among the ATM header fields is a 3-bit payload type (PT) field 260 used to discriminate between a cell payload carrying user information from a cell payload carrying management information. The PT field 260 of the header 252 in FIG. 7 is used to distinguish a status cell 250 from a standard data cell. Any desired combination of bits in the PT field 260 could be used to identify a status cell 250. Alternatively, a separate bit in another location of the header 252 can be used to distinguish status cells 250 and standard data cells.

After the destination end-system 208 has received the status cell 250, it returns the status cell 250 to the source end-system to allow it to examine the value collected in the $PL_{fb,f}$ field 256. In one embodiment of the invention, the value in the $PL_{fb,f}$ field 256 is placed into the backward priority level feedback field shown as $PL_{fb,b}$ 258. This allows the $PL_{fb,f}$ field 256 to gather priority level status information as the status cell 250 travels from the destination end-system 208 to the source end-system 206 in a manner similar to the source-to-destination status collection. Consequently, the destination end-system sets the $PL_{fb,f}$ field 256 to the lowest priority, corresponding to a priority level value of "7", and the status cell 250 is transmitted back into the network to return to the source end-system 206. During the return journey, the $PL_{fb,f}$ field 256 will again gather network load status information, this time for the connection from the destination end-system 208 to the source end-system 206. The previously collected load information stored in the $PL_{fb,b}$ 258 field will remain static for analyzation at the source end-system 206.

In another embodiment of the invention, several pairs of $PL_{fb,f}/PL_{fb,b}$ fields can be provided in the payload 254. This can provide the user with information regarding the network load conditions with respect to various parameters, such as various time periods. For example, first, second and third pairs of $PL_{fb,f}/PL_{fb,b}$ fields can provide the network load conditions during the last 100 milliseconds, 10 seconds, and 10 minutes respectively.

Referring now to FIG. 6 and Table 1 below, an example of the calculation of the forward priority level feedback $PL_{fb,f}$ 256 and the backwards priority level feedback $PL_{fb,b}$ 258 is described.

TABLE 1

|  | t < 1 | t = 1 | t = 2 | t = 3 | t = 4 | t = 5 | t = 6 |
|---|---|---|---|---|---|---|---|
| $PL_{a(NODE\ 202)}$ | 5 | 5 | 5 | 4 | 4 | 4 | 4 |
| $PL_{a(NODE\ 204)}$ | — | — | — | 6 | 6 | 6 | 6 |
| $PL_{fb,f}$ | 7 | 7 | 5 | 5 | 5 | 5 | 4 |
| $PL_{fb,b}$ | — | — | — | — | 5 | 5 | 5 |

As illustrated in FIG. 6, the status cell 222a–f is shown at times t=1 through t=6 respectively. Table 1 illustrates the $PL_{fb,f}$ 256 and $PL_{fb,b}$ 258 as compared to the allowable priority level $PL_a$ at nodes 202 and 204 at times t<1 through t=6. At time t<1, the $PL_{fb,f}$ is initialized to the lowest priority, thereby having a preset priority level value of "7". At time t=1, the status cell 222a is transmitted from the source end-system 206 to the ATM node 202, at which time the $PL_{fb,f}$ still has the value of "7". Because the node 202 has a PL value of "5", $PL_{fb,f}$ 256 within status cell 222b is decremented to a value of "5" at time t=2 to reflect the current worst-case $PL_a$ value of the connection. Node 204 has a $PL_a$ value of "6" at time t=3, which is greater than the current state of $PL_{fb,f}$ 256 which is equal to "5". Therefore, $PL_{fb,f}$ 256 remains unchanged at time t=3, when status cell 222c exits ATM node 204.

Between times t=3 and t=4, $PL_{fb,f}$ 256 is placed into the backward priority level feedback field $PL_{fb,b}$ 258. At time t=4, status cell 222d therefore includes a $PL_{fb,b}$ field 258 that stores the value "5" which corresponds to the worst-case allowable priority level of the source-to-destination connection. Because the node 204 still has a $PL_a$ value of "6", $PL_{fb,f}$ 256 of status cell 222e remains unchanged at a value of "5" at time t=5. However, at some time between t=2 and t=3, the $PL_a$ value at node 202 changed from "5" to "4", causing $PL_{fb,f}$ 256 in cell 222f to also be decreased to a value of "4". As can be seen from Tables 1, $PL_{fb,b}$ 258 remains static during the return journey (i.e., t=4 through t=6), so that the source-to-destination $PL_{fb,f}$ can be reported to the source end-system 206.

Figure 8:
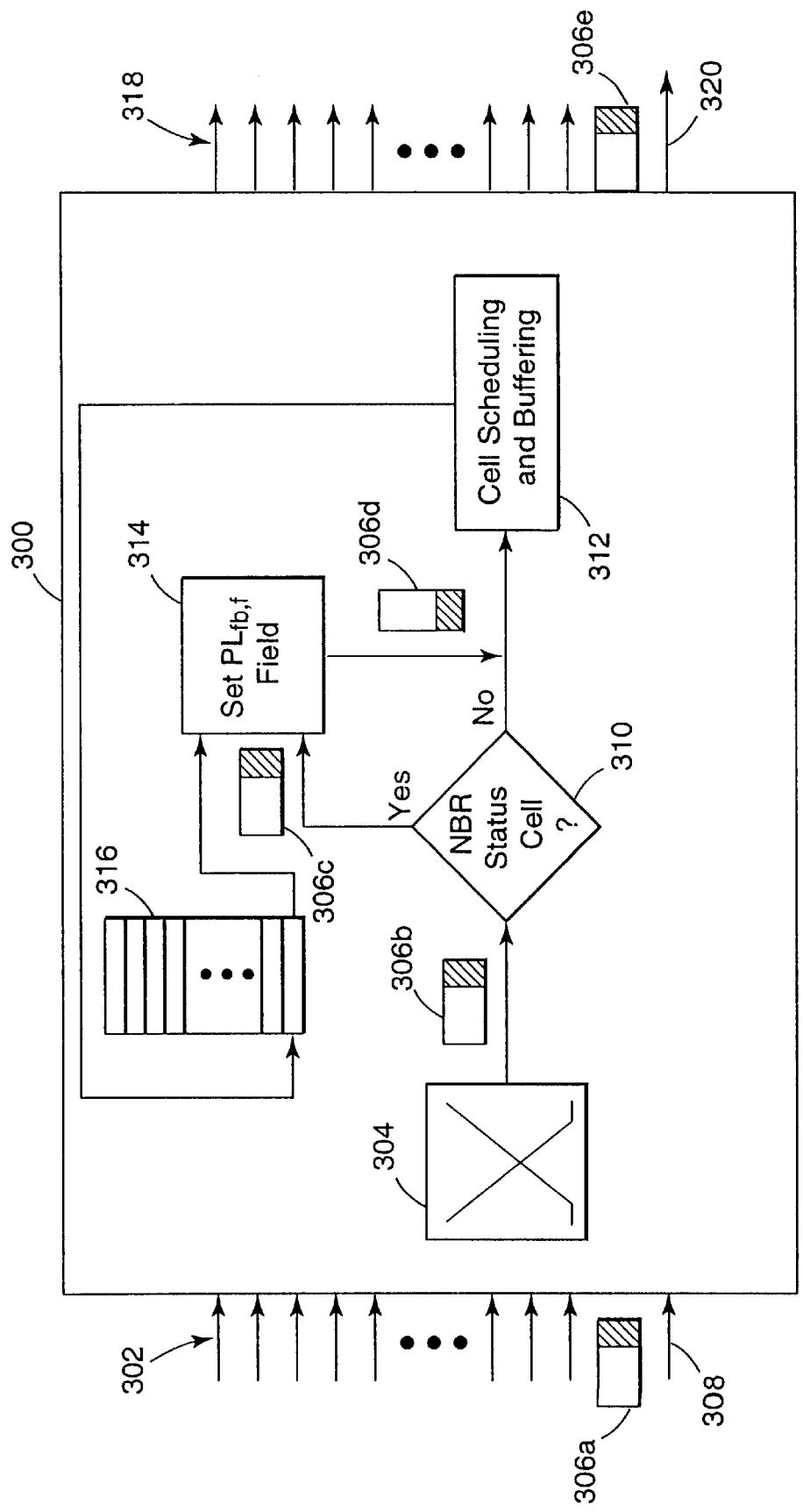
FIG. 8 is a block diagram of a representative ATM node within an ATM network configured to implement the NBR methodology.

FIG. 8 is a block diagram of an ATM node 300, representative of any of the nodes 202, 204 or additional nodes in the ATM network 200, configured for the NBR methodology. Each node may have multiple inputs from other nodes or end-stations, seen generally as links 302. The switch 304 receives each of the links 302 containing multiplexed information streams, and rearranges the information streams between input and output, as is generally known in the art. In the example of FIG. 8, switch 304 receives cell 306a at link 308, and provides the cell 306b at its output.

The ATM node 300 determines 310 whether the cell 306b is a standard data cell or a status cell configured for the NBR methodology. In one embodiment, this is accomplished by comparing a known value to a payload type value in the payload type (PT) field 260 in the header 252. Where the cell 306b is not an NBR status cell, it is a standard ATM information cell which is transferred to the cell scheduling and buffering circuitry 312, generally described in connection with FIGS. 4 and 5, which accepts and discards the cells according to the priority level of the cell and the current buffer occupancy level. Where the cell 306b is an NBR status cell, the $PL_{fb,f}$ field 256 is appropriately set 314 in the cell 306c in accordance with the current allowed priority level $PL_a$. The various $PL_a$ values for 1-each of the links coupled to the ATM node 300 are stored in a storage table 316. The $PL_{fb,f}$ field 256 is set 314 to a value equivalent to the $PL_a$ value in table 316 when $PL_a$ is less than the value currently residing in the $PL_{fb,f}$ field 256. Otherwise, the $PL_{fb,f}$ field 256 remains unchanged. Whether the $PL_{fb,f}$ field 256 is modified or not, the status cell 306d is provided to the cell scheduling and buffering circuitry 312 to be filtered and buffered like any standard ATM cell. Cells output the node 300 at output links 318, where the status cell 306e of this example is shown exiting node 300 via link 320.

Figure 9:
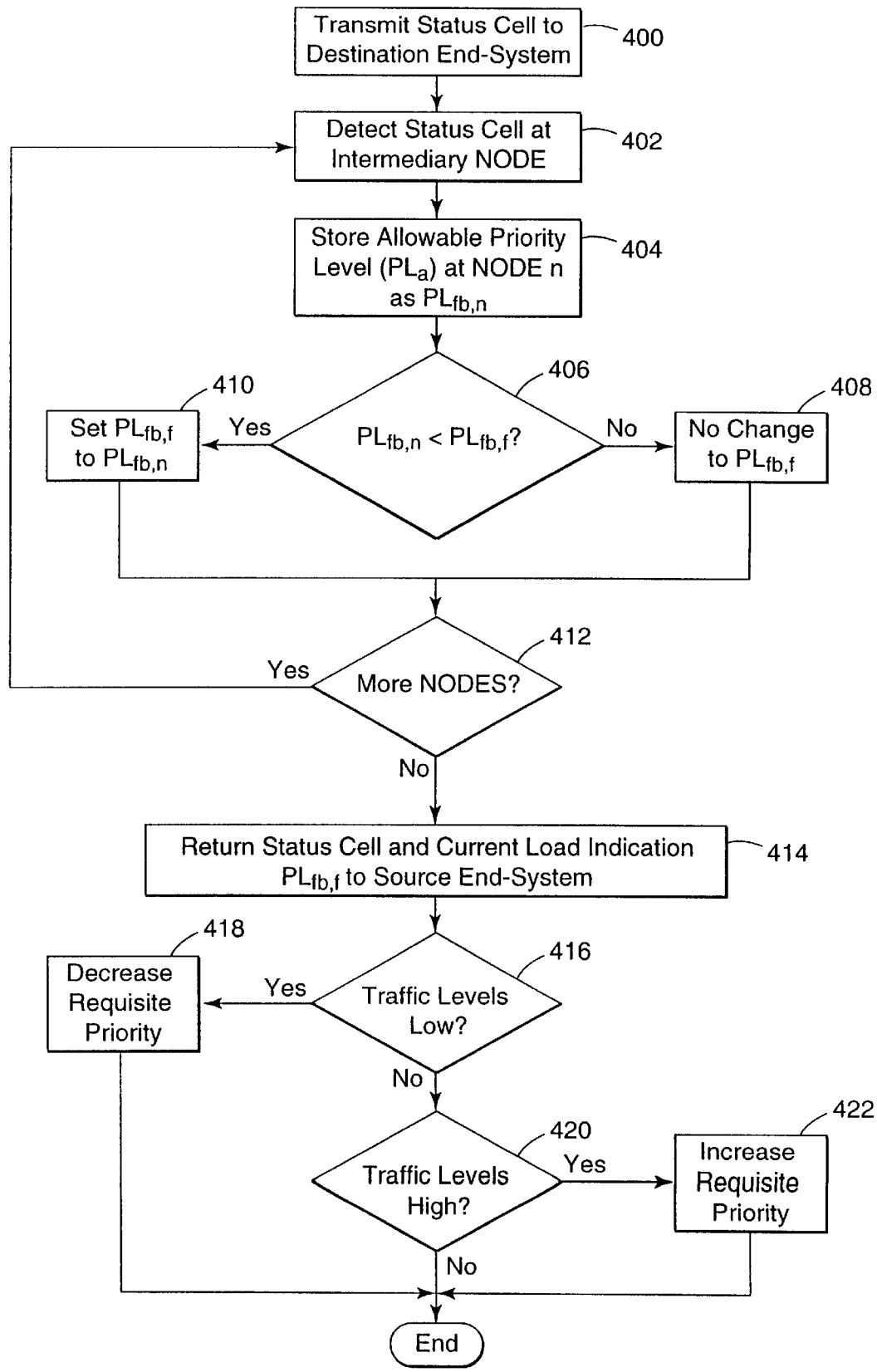
FIG. 9 illustrates in flow diagram form a general methodology by which NBR status cells can be used to provide feedback to a source end-station to optimize cell transfer rates in accordance with the present invention.

In FIG. 9, there is illustrated in flow diagram form, in accordance with one embodiment of the invention, a general methodology by which NBR status cells can be used to provide feedback to a source end-station so that cell transfer rates may be optimized. A status cell is transmitted 400 from the source end-system 206 to the destination end-system 208. Intermediary nodes, such as nodes 202 and 204 of FIG. 6, detect 402 status cells sent by users at the source. The allowable priority level $PL_a$ is stored 404 as $PL_{fb,f}$ at each of the intermediary nodes. The highest allowable priority level identified at all of the nodes traversed prior to the current node is available in the $PL_{fb,f}$ field 256 of the status cell, which can then be compared 406 to $PL_{fb,n}$ at each node. Where $PL_{fb,f}>PL_{fb,n}$, the node does not change 408 the value in the $PL_{fb,f}$ field 256. Where $PL_{fb,f}<PL_{fb,n}$, the value in the $PL_{fb,f}$ field 256 is set 410 to reflect the lowest allowable priority level identified up to this point in the connection, and is therefore decremented to equal $PL_{fb,n}$ at the node.

The status cell may encounter more nodes 412 as it progresses towards its destination. Where more intermediary nodes are in the path of the status cell, each of the intermediary nodes must detect 402 the status cell, and the $PL_{fb,f}$ field 256 is set accordingly 404, 406, 408, 410. Where no more intermediary nodes are encountered from source to destination, the status cell, and the current load indication $PL_{fb}$ is returned 414 to the source end system. In one embodiment of the invention, the value in the $PL_{fb,f}$ field 256 is placed into the backward priority level feedback field $PL_{fb,b}$ 258 prior to the cell's departure from the destination end-system 208. This allows new network load information to be gathered in the $PL_{fb,f}$ field 256 on the return connection without corrupting the network load information gathered on the source-to-destination connection.

When the source end-system 206 receives the returned status information, it can modify its current traffic parameters to optimize cell transmission. Where the returned status indicates that the cell traffic is relatively low 416, the user may decrease 418 the priority of newly issued ATM data cells to reflect a priority level that will likely be accepted at each of the nodes of the connection. Similarly, where the cell traffic appears to be relatively high 420, the user may increase 422 the priority of newly issued data cells. This allows adjustment of the confidence level that data cells will not be discarded at any node along the connection. The returned status is therefore used to allow the user to adjust the cell transfer rate (CTR) of cells exiting the source end-system 206 to the network.

Figure 10:
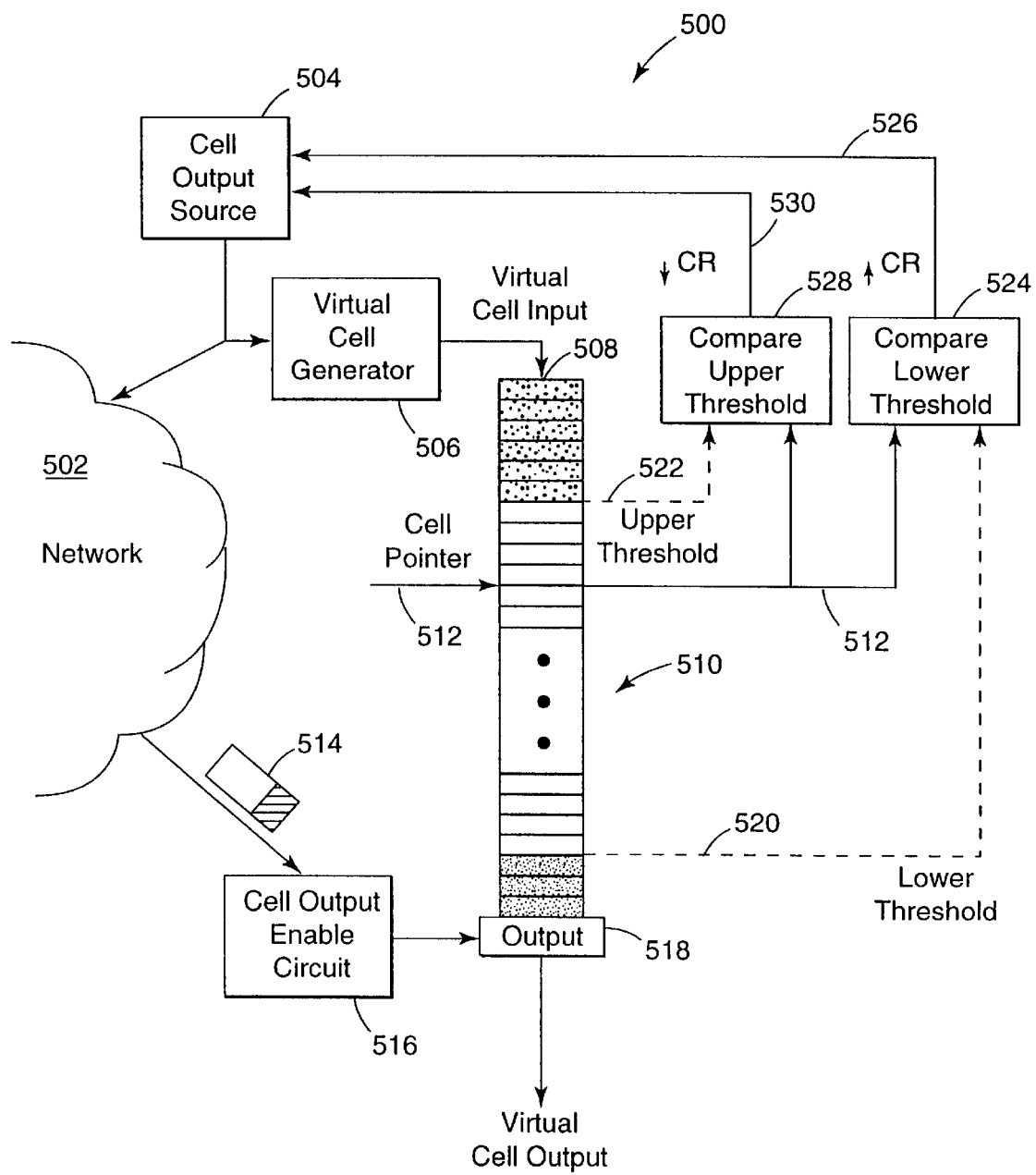
FIG. 10 is a block diagram of a cell transfer circuit in accordance with one embodiment of the present invention.

FIG. 10 is a block diagram of a cell transfer circuit in accordance with the present invention. The cell transfer circuit 500 is responsible for transmitting cells identified by the user to the network 502. The cell transfer circuit 500 provides the ability to adjust the transmission rate of cells such that acceptable cell loss probabilities can be realized.

In the embodiment illustrated in FIG. 10, the cell output source 504 is responsible for driving information destined for a destination end-system via the network 502. As cells are outputted from the cell output source 504, the virtual cell generator 506 recognizes each of the cells transmitted to the network 502, and generates a stream of corresponding virtual cells at the virtual cell input 508 of the buffer 510. Therefore, the buffer 510 is filled as cells are output from the cell output source 504. The current occupancy level of the buffer 510 is indicated by an address which points to the next available buffer 510 location, illustrated as the cell pointer on line 512.

The buffer 510 is emptied at a rate corresponding to the worst-case allowable priority accepted at the nodes of the virtual connection. As previously described, this worst-case allowable priority is returned to the source by way of priority level feedback contained in a status cell 514. Status cell 514 is generally the same as status cell 250 illustrated in FIG. 7, which included the $PL_{fb,b}$ field 258 containing the typical priority level that is being accepted by the nodes of a connection.

The cell output enable circuit 516 receives the status cell 514, and adjusts the rate at which the buffer 510 can empty the virtual cells at the virtual cell output 518. In one embodiment of the invention, each node on a connection indicates one of eight priority levels that is still being accepted at each of the nodes of the connection. These eight priority levels can be represented by three bits in the $PL_{fb,b}$ field of the status cell 514. These bits are generally decoded at the cell output enable circuit 516, to provide eight cell transfer rates at the output 518 of buffer 510. For example, the cell output enable circuit 516 can generate one of eight pulse trains, each pulse train having a different frequency which controls the rate at which virtual cells are output from the buffer 510.

The buffer 510 is therefore filled in accordance with the rate at which the cell output source 504 transmits cells to the network 502, and is emptied at the rate at which the output 518 is enabled to output virtual cells under the control of the cell output enable circuit 516. Where the cell output source 504 is transmitting cells to the network 502 faster than the virtual cells are being outputted via the output 518, the occupancy level of the buffer 510 increases. Analogously, where the cell output source 504 is transmitting cells to the network 502 at a slower rate than the cell output enable circuit 516 is allowing the output 518 to output virtual cells, the occupancy level of buffer 510 decreases.

As the network nodes become more restrictive in allowing cells to be accepted at the node (indicated by a decrease in the allowable priority level $PL_a$), a lower cell transmission rate is more likely to result in a successful source-to-destination transmission. This is due to a decrease in the required bandwidth, which in turn decreases the occupancy level of the buffers at the nodes generally depicted as the memory 90 in FIG. 4 and the buffers 93, 94 of FIG. 5, which ultimately causes the allowable priority level $PL_a$ to increase. The rate at which the cell output enable circuit 516 enables the output 518 to output virtual cells is proportional to the allowable priority level accepted at the nodes of the connection. Therefore, the occupancy level of the buffer 510 is proportional to, and an indication of, the availability of the connection to take on additional bandwidth.

In order to control the cell Transmission rate at the cell output source 504 according to the occupancy level of the buffer 510, a lower threshold level 520 and an upper threshold level 522 within the buffer 510 are established. When the occupancy level of the buffer 510 decreases below the lower threshold 520, it indicates that the buffer has a low enough occupancy level that it would be acceptable to raise the cell transfer rate from the cell output source 504. Similarly, if the occupancy level of the buffer 510 raises above the upper threshold 522, it would indicate that the cell output source 504 should reduce its cell transfer rate to the network 502.

The compare lower threshold circuit 524 compares the predefined lower threshold value 520 with the current location of the cell pointer 512. The cell pointer 512 indicates the current occupancy level of the buffer 510. The compare lower threshold circuit 524 therefore determines whether the occupancy level has dropped below the lower threshold 520. Where the cell pointer 512 has dropped below the lower threshold 520, the compare lower threshold 524 sends a signal on line 526 to the cell output source 504 to increase its cell rate.

Similarly, the compare upper threshold circuit 528 determines whether the occupancy level has increased above the upper threshold 522. Where the cell pointer 512 has risen above the upper threshold 522, the compare upper threshold 528 sends a signal on l-ne 530 to the cell output source 504 to decrease its cell rate.

The manner in which the cell transfer rate of one embodiment of the invention is changed by the cell output source 504 is shown in Table 2 below:

TABLE 2

| $PL_{fb,b}$ | 7 | 6 | 5 | 4 | 3 | 2 | 1 | 0 |
|---|---|---|---|---|---|---|---|---|
| Rate | 8*NBR | 4*NBR | 2*NBR | NBR | NBR/2 | NBR/4 | NBR/8 | NBR/16 |

The buffer emptying rate is shown as a function of the accepted priority level of the connection, which is returned to the source in the $PL_{fb,b}$ field 258. When the returned $PL_{fb,b}$ is equal to 4, the rate at which virtual cells are emptied from the buffer 510 is equal to the NBR. As $PL_{fb,b}$ increases, indicating that there may be additional available bandwidth, the buffer emptying rate will increase, which will eventually cause the occupancy level of the buffer 510 to reach the lower threshold 520. This causes the compare lower threshold circuit 524 to send a signal to the cell output source 504 to increase the cell transfer rate to the network 502. For example, a $PL_{fb,b}$ of 7 in the status cell 514 will cause the occupancy level of the buffer 510 to decrease at a rate of 8 times the nominal bit rate.

As $PL_{fb,b}$ decreases, it indicates that bandwidth is becoming more limited on the connection. The buffer emptying rate decreases in response to the decreasing $PL_{fb,b}$, which eventually causes the occupancy level of the buffer 510 to reach the upper threshold 522. Upon reaching the upper threshold 522, the compare upper threshold circuit 528 sends a signal to the cell output source 504 to decrease the cell transfer rate to the network 502. For example, a $PL_{fb,b}$ of value 1 in the status cell 514 will cause the buffer 510 to be emptied at a rate of 1/16 times the nominal bit rate.

Figure 11:
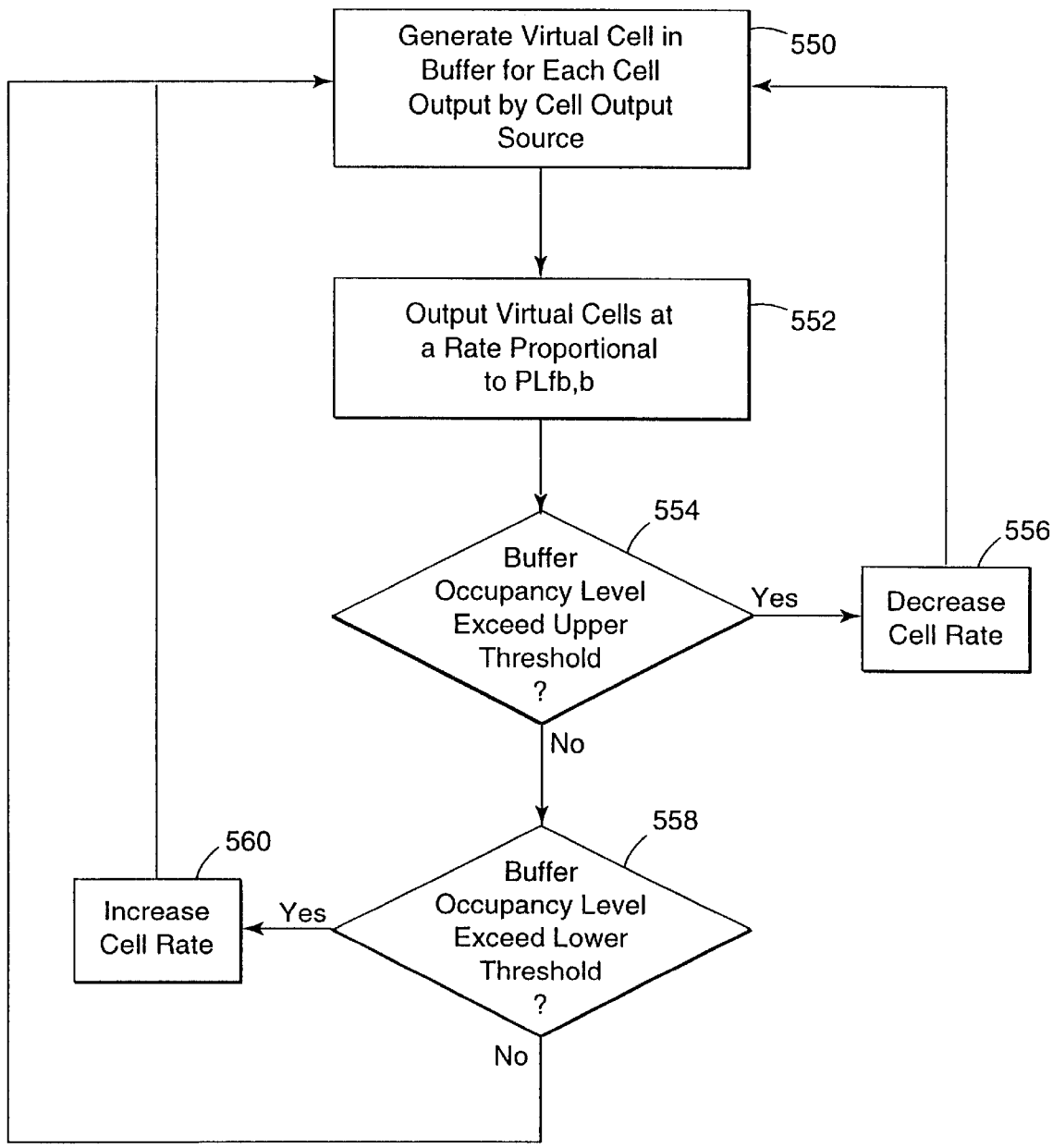
FIG. 11 illustrates in flow diagram form a general procedure for varying the cell transfer rate of the source end-system in accordance wit-h an embodiment of the present invention.

FIG. 11 illustrates in flow diagram form a general procedure for varying the cell transfer rate of the source end-system in accordance with an embodiment of the present invention. Virtual cells are generated 550 in the buffer 510 for each of the cells output by the cell output source 504. The virtual cells are then output 552 from the buffer 510 at a rate which is proportional to the typical allowable priority level of the connection returned to the source by way of the $PL_{fb,b}$ field of the status cell.

The occupancy level of the buffer is compared 554 to an upper threshold value to determine whether the current occupancy level exceeds the upper threshold value. If it exceeds the upper threshold value, the cell transfer rate of the cell output source 504 is decreased 556. The buffer occupancy level is also compared 558 to a lower threshold value, and if it exceeds the lower threshold value (i.e., indicates an occupancy level lower than the lower threshold value) the cell rate is increased 560 at the cell output source 504. The upper and lower threshold values are continually monitored 554, 558 as virtual cells are input and output from the buffer 510.

Figure 12:
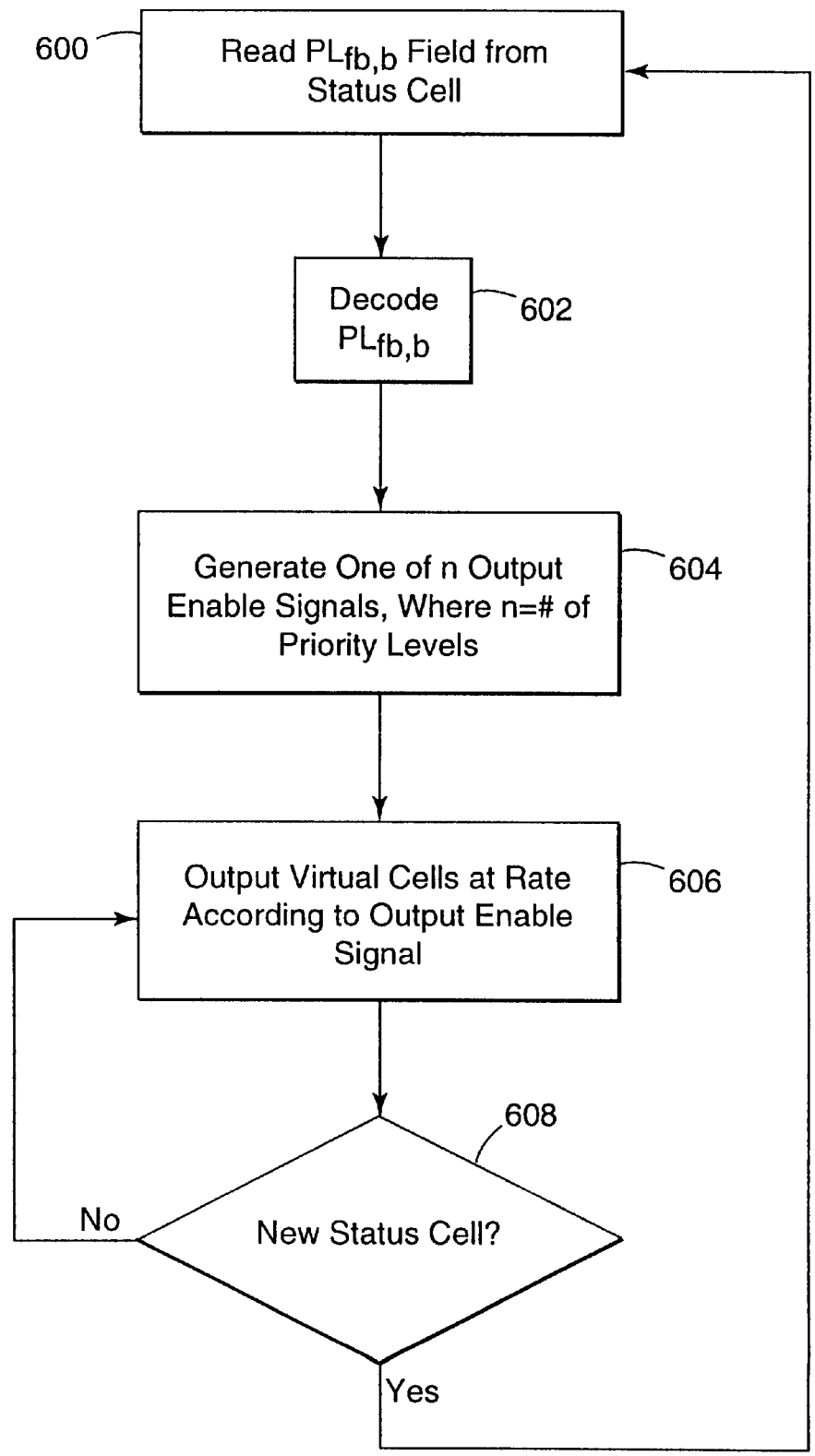
FIG. 12 illustrates in flow diagram form a general methodology for modifying the rate at which virtual cells are output from a buffer.

FIG. 12 illustrates in flow diagram form a general methodology for which the output rate of the virtual cells from the buffer 510 is modified. The $PL_{fb,b}$ field from the status cell is read 600, and the corresponding value is decoded 602 into n levels, where n depends on the number of bits in the $PL_{fb,b}$ field 258. As previously indicated, one embodiment of the invention includes eight priority levels which can be encoded into three bits, resulting in a three bit $PL_{fb,b}$ field 258 and 8 decoded levels. One of n output enable signals is generated 604, which in turn dictates the rate at which virtual cells are output 606 from the buffer 510. When a new status cell is detected 608, the enable signal is reconfigured according to the new value read 600 from the $PL_{fb,b}$ field 258. Otherwise, until a new status cell is detected 608, the virtual cells continue to be output 606 at the same rate.

Figure 13:
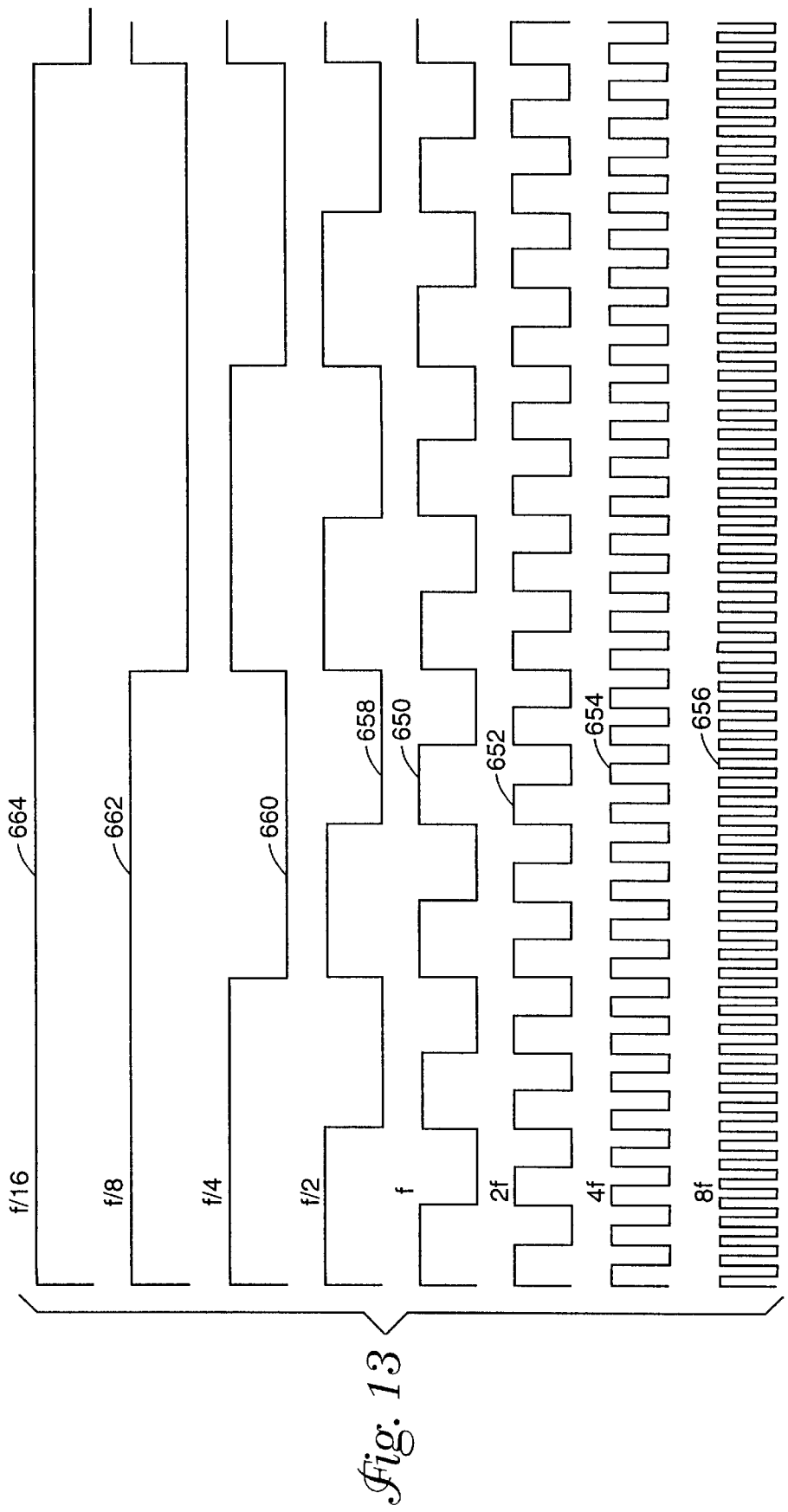
FIG. 13 is a waveform diagram illustrating one embodiment of various output enable signals generated at the cell output enable circuit.

FIG. 13 is a waveform diagram illustrating one embodiment of various output enable signals generated at the cell output enable circuit 516. FIG. 13 incudes eight different waveforms, each allowing the buffer 510 to be emptied at a different rate. Waveform 650, for purposes of this example, is considered a periodic output enable signal having a frequency of "f". As the $PL_{fb,b}$ field 258 from the status cell rises, it indicates that additional bandwidth on the connection may be available. Under such circumstances, the cell transfer rate of the cell output source 504 may be increased. This requires that the cell pointer 512 be reduced to below the lower threshold value 520, which in turn indicates that the buffer 510 should be emptied at a faster rate. This is accomplished by increasing the frequency of the output enable signal, which can be seen in waveforms 652 where the frequency has been doubled, waveform 654 where the frequency has been multiplied by a factor of four, and waveform 656 where the waveform has been multiplied by a factor of eight.

Where the connection bandwidth becomes increasingly limited, the value in the $PL_{fb,b}$ field 258 decreases. In such a case, the cell transfer rate from the cell output source 504 should be decreased, which is accomplished by more quickly filling the buffer 510. This occurs by reducing the rate of the output enable signal, so that virtual cells are output at a slower rate. This can be seen at waveforms 658, 660, 662 and 664, where the frequency is divided by two, four, eight and sixteen respectively.

It should be recognized that the output enable signals shown in FIG. 13 are not required to incrementally vary by a factor of two as illustrated in FIG. 13. Rather, various clock signals of predefined frequencies can be used. Furthermore, it should be recognized that the waveforms of FIG. 13 need only trigger the output virtual cells so that the 50% duty cycles illustrated in FIG. 13 is not a requirement, but rather is shown by way of example only. For instance, waveforms having 10% duty cycles resembling periodic pulse trains rather than symmetrically oscillating signals can be used where the output circuitry 518 is designed to trigger on such pulses.

Figure 14:
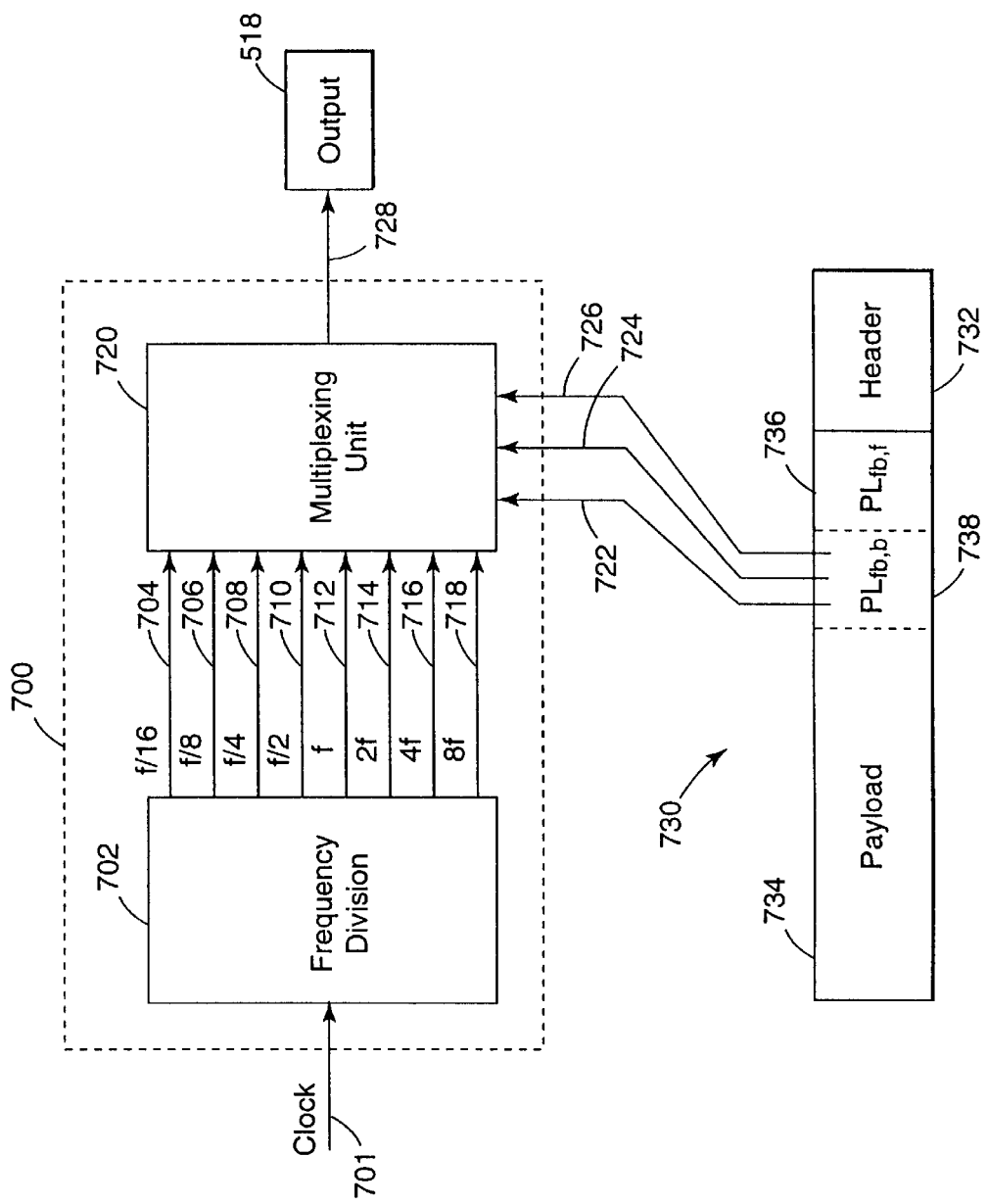
FIG. 14 illustrates an embodiment of a cell output enable circuit used to control the rate at which virtual cells are output from the buffer.

Referring now to FIG. 14, one embodiment of a cell output enable circuit 700 is illustrated. An oscillating input clock signal shown on line 701 is input into a frequency division unit 702. The frequency division unit 702 provides a plurality of output signals of various multiples of the clock frequency of the clock signal on line 701. In this example, an 8:1 frequency division occurs resulting in eight different output enable signals on lines 704, 706, 708, 710, 712, 714, 716, and 718. The signals on lines 704–718 of the present example correspond to the waveforms illustrated in FIG. 13, where the nominal frequency on waveform 650 is shown on line 712 of FIG. 14. The generated signal waveforms are fed into a multiplexing unit 720 that is controlled by control lines 722, 724 and 726. Depending on the state of the control lines, the multiplexing unit 720 selects one of its inputs on line 704–718 to be output to the output circuit 518 on line 728. The output circuit 518 will allow passage of a virtual cell from the buffer 510 at each occurrence of a pulse or transition level of the signal on line 728.

The status cell 730 includes a header 732, a payload 734, a forward priority level feedback field $PL_{fb,f}$ 736, and a backward priority level feedback $PL_{fb,b}$ 738. The feedback value in the $PL_{fb,b}$ 738 makes up the control signals 722, 724 and 726 to the multiplexing unit 720. Therefore, depending on the typical allowable priority level being accepted at the nodes of the connection, one of the eight signals on line 704–718 will be selected depending on the state of the three bits in the $PL_{fb,b}$ 738. It should be recognized that the size of the $PL_{fb,b}$ field 738 will depend on the number of priority levels selected for the system.

Other embodiments of cell output enable circuits 516 and 700 could be used without departing from the scope and spirit of the invention. For example, the signals on control lines 722, 724 and 726 can be input into a 3:8 decoder, where each of the eight decoded signals feeds an individual tri-state driver whose outputs are commonly coupled as the output enable signal. Each of the tri-state drivers would have a different input clock signal which would be selected when its respective enable input was activated by a selected signal on the 3:8 decoder. In yet another embodiment, the cell output enable circuit 516 can be a computing device, or a portion thereof, operating under the control of software that regulates the rate at which virtual cells are output from the buffer 510.

For purposes of illustration, and not of limitation, examples are provided below to illustrate the relationship between the quality of service of an NBR or SIMA connection and throughput at different priority levels. The following examples demonstrate, in accordance with one embodiment of the present invention, the relative differences in QoS with respect to adjacent priorities, such as the QoS associated with PL=4 in comparison to that of PL=3. It is not-ed that a higher cost or fee is typically assessed to users who request a higher priority for cells transmitted from the user's user/network interface. By way of example, the user fee may be doubled if the user wants to obtain one degree of higher priority for every cell without changing the actual bit rate. The resulting QoS of the connection, therefore, should be improved such that at least some users are willing to pay the additional charge.

EXAMPLE #1

In accordance with this illustrative example, the following assumptions and consideration are given. It is assumed that there are many identical traffic sources which generate traffic independent of the current or previous load conditions in the network. The following traffic parameters are assumed: the link capacity is C=1, which is useful in the examples as a means of normalization; the peak bit rate $MBR_{max}=0.1$, which represents 10 percent of the link capacity, C; the ON probability at the burst (or packet) scale=0.2; and the average burst duration=1,000 time slots (i.e., the average packet size=100 cells). In addition, it is assumed that there is an upper ON/OFF layer, and that both the average ON-period and OFF-period of this layer are 100,000 time slots. The real time buffer 93 contains 200 cell locations and the non-real-time buffer 94 contains 5,000 cell locations. It is noted that the upper ON/OFF layer attempts to model the traffic process of connections, in which the determination of the number of connections is understood in the art to constitute a stochastic, random process. For example, if it is assumed that the total number of customers is represented by the variable x, then the average number of connections is x/2. More particularly, the number of connections is understood to be binomially distributed. As such, 100,000 time slots represent the average holding time of a connection, and, also, the average idle period realizable by the user. As a consequence, a user is transmitting cells only if a connection is active both at the connection layer and the packet layer. A time scale parameter, α, can be obtained for the real-time and non-real-time connections:

$\alpha_{rt}=0.025$ $\alpha_{nrt}=0.001$

In this example, eight different connection types are assumed: four connections are real-time connections and four are non-real-time connections. Also, four different NBR values, which have been normalized with respect the link capacity of C=1, are assumed as: 0.2, 0.1, 0.05 and 0.025. The priorities corresponding to these NBR values, with $MBR_{max}=0.1$, are 3, 4, 5 and 6, respectively. It should be noted, however, that not all cells are assigned these exact priorities, and that especially with non-real-time connections, many cells obtain better priority values because of the affects of the averaging measuring principle. The distribution of cells having different priority levels, represented as percentages, is presented below in Table 3:

TABLE 3

| PRIORITY LEVEL | REAL (SIMULATED) PERCENTAGE OF OFFERED CELLS | PERCENTAGE BASED ON PEAK RATES |
|---|---|---|
| 1 | 6.1 | 0 |
| 2 | 7.9 | 0 |
| 3 | 24.3 | 25 |
| 4 | 23.5 | 25 |
| 5 | 21.5 | 25 |
| 6 | 16.8 | 25 |

Figure 15:
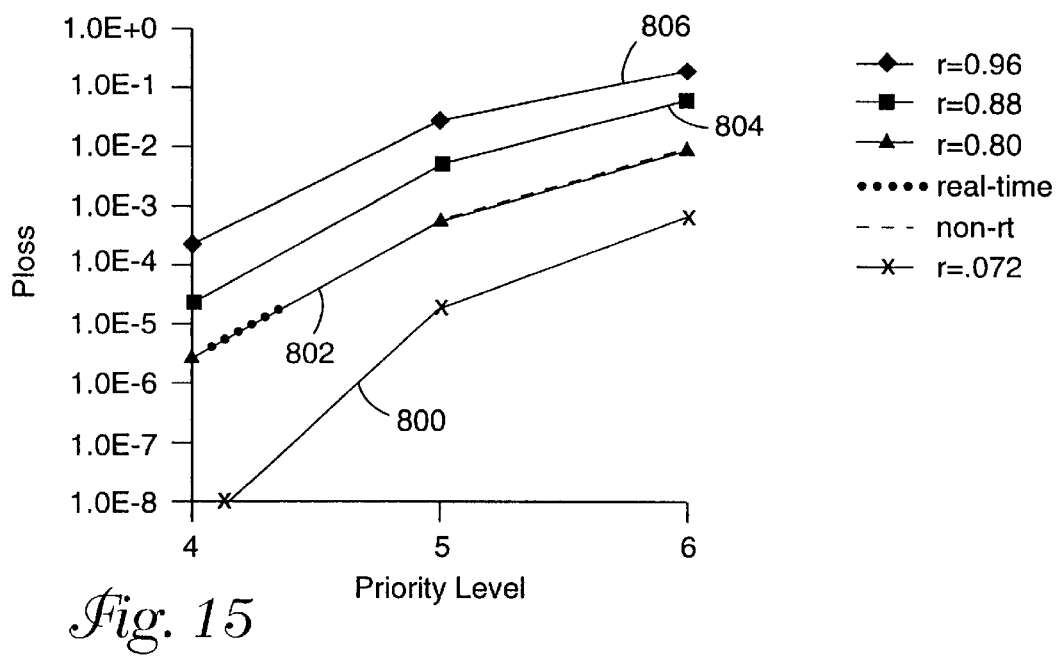
FIGS. 15–16 are graphical depictions of the relationship of average cell loss ratio, $P_{loss}$, as a function of priority level for four specific load levels.

In FIG. 15, there is shown a graph illustrating the relationship of average cell loss ratio, $P_{loss}$, as a function of priority level for four specific load levels, r. In particular, line-800 represents an overall average load level of 0.72 for 9 connections of each connection type (i.e., real-time and non-real-time connection types). Line-802 depicts an average load level of 0.80 for 10 connections of each connection type. Further, line-804 represents an average load level of 0.88 for 11 connections of each connection type, and line-806 represents an average load level of 0.96 for 12 connections of each connection type. It is noted that, in the case of line-802 indicating a load level of 0.80, the cell loss ratios, $P_{loss}$, for real-time and non-real-time cells are indicated by dotted and broken lines, respectively.

Given, for example, a traffic scenario where the operator wants to offer a cell loss ratio of $10^{-6}$ to cells with priority 4, the total load can be approximately 0.75. It can be assumed that this average cell loss ratio is sufficient for most video applications. Give the same traffic load conditions, priority level 5, which corresponds to $P_{loss} \approx 10^{-4}$, can meet the requirements of many voice applications, while priority 6, which corresponds to $P_{loss} \approx 3 \cdot 10^{-3}$, is suitable for a TCP/IP type of file transfer, provided that there is an adequate packet discarding scheme in place.

It should be emphasized, however, that the difference in cell loss ratio between adjacent priorities depends strongly on the offered traffic process and, in particular, the inherent control loops of the NBR or SIMA service. When the user perceives an unsatisfactory QoS, for example, the user can, and should, change either the actual bit rate or the nominal bit rate of the connection. In either case, the priority distribution changes as well. Nevertheless, if this phenomenon is temporarily ignored, the basic behavior of priority distribution may be further appreciated by making the following simplifying assumption: If it is assumed that all traffic variations are slow as compared to the measuring period and buffer size, then a well-known, conventional ATM approach to approximating cell loss ratio may be used, with the additional requirement that the eight NBR priority levels are taken into account.

If the loss ratio of cells with priority k is denoted by $P_{loss,k}$, and the average loss ratio of cells with a priority of 0 to k is denoted by $P^*_{loss,k}$, then the following equation, which ignores buffering effect, provides that:

$$P^*_{loss,k} = \frac{\sum_{j:\lambda_j>c} Pr\{\lambda^*_k = \lambda_j\}(\lambda_j - c)}{\rho^*_k c} \quad [2]$$

$$P_{loss,0} = P^*_{loss,0}$$

$$P_{loss,0} = \frac{\rho^*_k P^*_{loss,k} - \rho^*_{k-1} P^*_{loss,k-1}}{\rho^*_k - \rho^*_{k-1}} \text{ for } k = 1 \ldots 7$$

where, $\lambda^*_k$ represents the momentary bit rate level of all cells with a priority of 0 to k, $\rho^*_k$ represents the average offered load produced by these cells, and c represents the link capacity. The probability $Pr\{\lambda^*_k=\lambda_j\}$ can be calculated in a straightforward manner using known convolution techniques.

EXAMPLE #2

For purposes of further illustration, a second example is provided which assumes the same sources described in Example #1, except for the long ON and OFF periods. Because of the long periods reflected in Example #1, the peak rate always determines the cell priority. As the buffers are typically not capable of filtering any traffic variations, the allowed load in Example #2 is much lower than that in the original case of Example #1.

Figure 16:
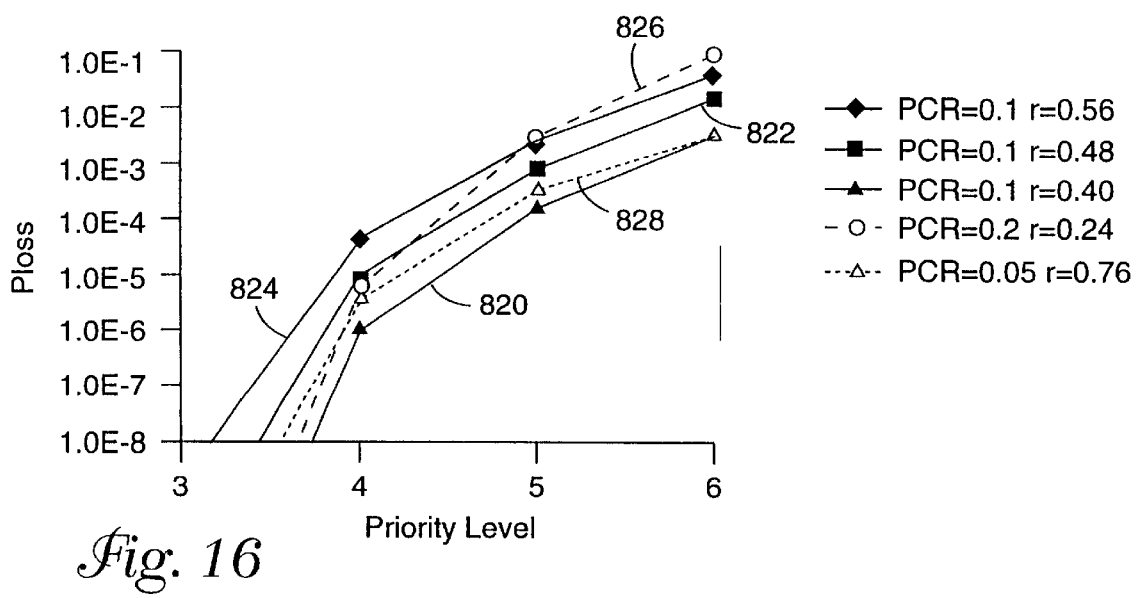

In FIG. 16, there is illustrated in graphical form a relationship between cell loss ratio as a function of priority level for different load levels, r. It is assumed in FIG. 16 that the peak cell rate of each connections depicted by solid lines 820, 822, 824 is 0.1, the peak cell rate of each connect-on depicted by the broken line-826 is 0.2, and the peak cell rate of each connection depicted by the dotted line-828 is 0.05.

FIG. 16 shows the cell loss probabilities obtained by application of Equation [2] for different priorities, depicted by the three solid lines, line-820, line-822, and line-824. In addition, two slightly different traffic cases are represented by the dotted line-828 and the broken line-826. The effects of changing the traffic variations are reflected in the graph provided in FIG. 16. The actual change in traffic variations is a direct consequence of doubling or halving bit rates and NBR values.

In a network that embraces the NBR/SIMA service concept, an increase of traffic variations has two main effects if the operator keeps the QoS of priority level 4 unchanged. First, the allowed load level is decreased in the same way as in conventional ATM, and second, the difference in cell loss ratio between adjacent priority level decreases. For purposes of providing a rough estimate of QoS based on FIGS. 15 and 16, it may be assumed that if priority level 4 offers a cell loss probability of $10^{-6}$, then the cell loss probability will be approximately $10^{-4}$ to $10^{-3}$ with priority level 5 depending on the overall traffic variations. The cell loss ratio with priority level 3 may be assumed to be less than $10^{-9}$, unless the traffic variations are very pronounced.

Although the above examples provide illustrations of relationships between QoS and priority levels, it may be unfruitful to attempt to exactly determine the allowed load or the cell loss difference between adjacent priority levels until user reactions to different QoS and usage charges are evaluated. In an NBR/SIMA service environment, a schedule of charges based on different QoS levels may be determined, in a certain sense, automatically. For example, if the difference in cell loss ratio between priority levels 4 and 5 is very small, it can be assumed that some of the connections will tend to move from priority level 4 to level 5 because of a lower assessed charge. This change indicates, apparently, that the cell loss ratio of priority level 4 decreases and the cell loss ratio of priority level 5 increases. It can be reasonably assumed that this type of movement continues until the QoS difference corresponds to the average user's expectation of a reasonable charging structure.

Similar concerns are raised with regard to the differences in charging which occur automatically during busy hours in contrast to idle hours. For example, it would appear reasonable to charge higher prices during periods of high load for a certain QoS, and charge lower prices during low load periods. However, it is believed desirable to avoid instigating a charging policy that assesses different fees for a certain NBR during busy and idle periods, which also avoids increasing the complexity of the charging scheme. The naturally occurring "supply and demand" effect may tend to automatically even out the load between busy and idle hours. It is anticipated that, if a user is displeased with the observable difference in QoS during busy and idle periods, the user may be motivated to pay a different rate during such periods.

EXAMPLE #3

Another important transmission control aspect is the modification and adjustment of the cell transfer rate, or similarly, the measured bit rate (MBR). It is possible to provide those sources, which are able to change their bit rate, information about the current load condition on their respective connections. This example provides a performance outlook for these connections.

For the present example, the background traffic process generated by the sources previously described in Examples 1 and 2 is used. It is also assumed that there are 10 connections of each type, thereby providing an average background load of r=0.080. There are also three sources (hereinafter referred to as feedback sources FBS1, FBS2 and FBS3) that adjust their transmission rate according to the feedback information received via the network status cells. All of these feedback sources are assumed to have an NBR of 0.01.

The feedback sources are similar to each other, except for their time periods which are used in determining $PL_{fb}$ information. More specifically, the feedback source time periods are 10,000 time slots for FBS1, 30,000 time slots for FBS2, and 100,000 time slots for FBS3. For comparison purposes to the feedback sources, three constant bit rate connections (source connections C4, C5 and C6) are also discussed, which have the following parameters (link capacity=1):

TABLE 4

|   | Bit-rate/NBR | NBR | Priority Level (PL) |
|---|---|---|---|
| C4 | 1.4 | 0.01 | 4 |
| C5 | 2.8 | 0.01 | 5 |
| C6 | 5.5 | 0.01 | 6 |

The cell sources in Table 4 are set such that they transmit at a rate that is slightly less than the threshold that borders the next higher priority level. For example, using Equation 1, bit rate/NBR ratio equal to 1.5 would result in a cell priority level of 5 (integer portion of 5.08), while a bit rate/NBR ratio of 1.4 yields a cell priority level of 4 (integer portion of 4.98). The feedback sources have been set to the same bit rate values in this example in order to optimally utilize the network capacity.

Figure 17:
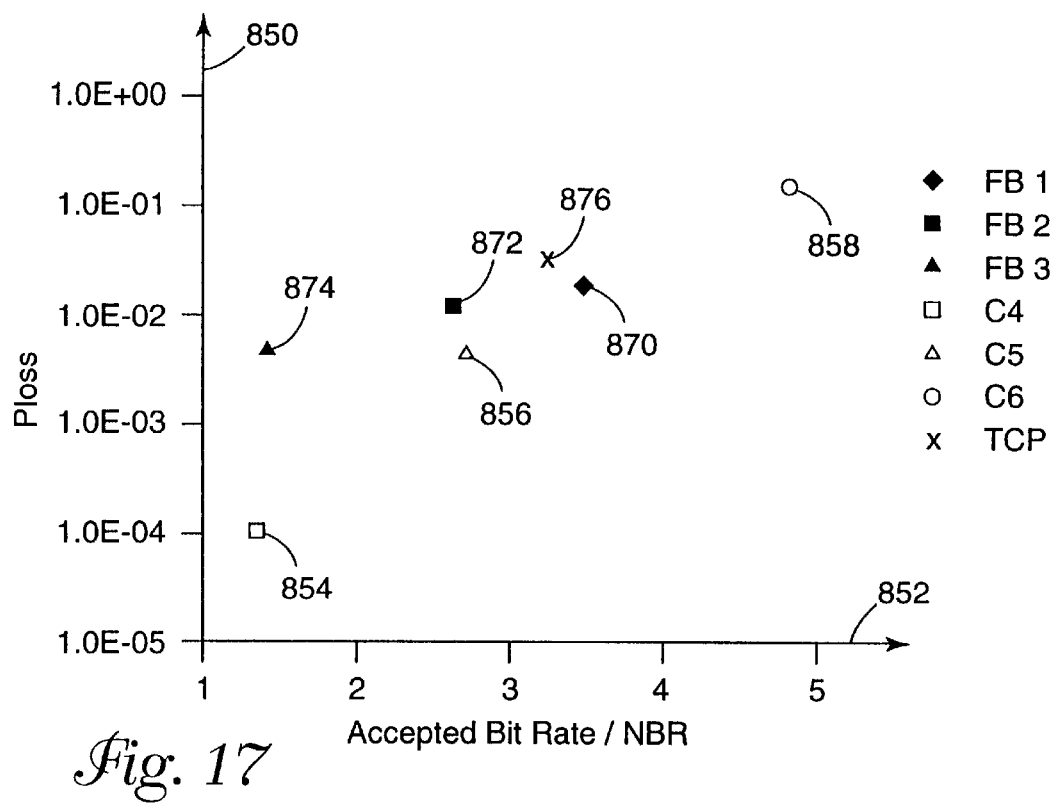
FIG. 17 is a graphical illustration of the results of a simulation which compares the constant bit rate connections to those using feedback sources.

In FIG. 17, there is shown a graph illustrating the results of a simulation comparing the constant bit rate connections to those using feedback sources. The cell loss ratio is plotted on the vertical axis 850 as a function of accepted bit rate/NBR plotted on the horizontal axis 852. The graph illustrates that constant bit rate sources, C4 854, C5 856, and C6 858, obtain better loss vs. throughput characteristics when they are transmitting cells at lower priority level values (i.e., at higher priorities). However, the results indicate that feedback sources, which adjust their rate using feedback information from the status cells, are useful when the background traffic is changing slowly. The feedback sources FB1 870, FB2 872 and FB3 874 can adapt to changes, while constant bit rate sources cannot take advantage of the changing load of the network. With fast changing background traffic, feedback sources are not able to adjust to changes fast enough, resulting in an increased cell loss ratio.

FIG. 17 also illustrates the use of one source that generally performs as a kind of TCP source 876 with NBR=0.01. This source halves its transmission rate when it receives information about a lost cell, and increases its transmission rate by 10% if it does not receive information regarding lost cells over a time period of 10,000 time slots. Comparison reveals that this kind of source loses more cells than corresponding feedback sources. This is expected, as this type of source has a slower reaction to changes.

Figure 18:
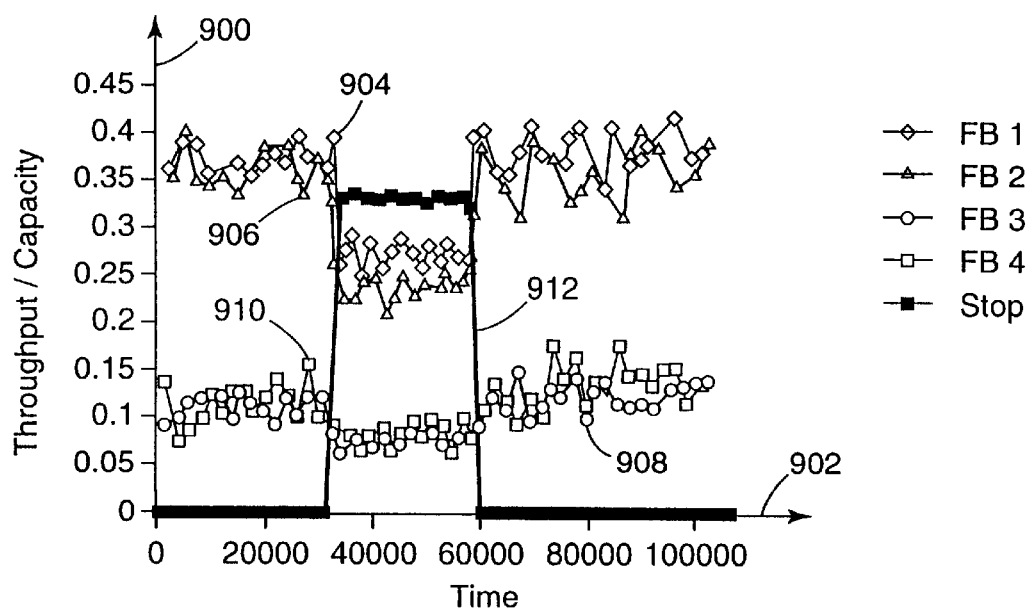
FIG. 18 is a graphical illustration of the throughput/capacity from each of the feedback sources as a function of time.

Another aspect to be considered involves the ability of the connections to be adjusted in during periods of sudden capacity changes, as well as how the capacity division between different feedback connections will be managed. Referring now to FIG. 18, a graphical illustration of the throughput/capacity (vertical axis 900) from each of the sources is shown as a function of time (horizontal axis 902). FIG. 18 provides an example of four feedback sources (FB1 904, FB2 906, FB3 908 and FB4 910) are transmitting cells to a network node, where FB1 904 and FB2 906 have an NBR=0.25, and FB3 908 and FB4 910 have an NBR= 0.0625. At a time corresponding to 30,000 time slots, a uniform source begins to transmit, shown as step function 912, with a cell rate of PCR=0.333 at an NBR=0.333. At a time corresponding to 60,000 time slots, the uniform source terminates its cell transmission.

As can be seen in FIG. 18, the feedback sources (FB) are able to adjust their transmission rates in view of the load step function 912 on the connection. All the feedback sources have roughly the same decrease of throughput when the step source 912 is switched on. After the step source is switched off, the feedback sources restore their original throughput.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for regulating a transfer rate of information cells transmitted from a network source unit to a network destination unit across a network connection, comprising:

acquiring connection availability information corresponding to a level of bandwidth available on the network connection;

simulating the connection availability information using a simulation buffer accessible by the network source unit; and regulating the transfer rate of information cells transmitted from the network source unit in response to an occupancy level of the simulation buffer.

2. The method of claim 1, wherein the occupancy level of the simulation buffer is indicative of the level of bandwidth available on the network connection.

3. The method of claim 1, wherein the simulating the connection availability information further comprises operating the simulation buffer in a manner that substantially mimics a buffer provided at a node defined along the network connection.

4. The method of claim 1, wherein regulating the cell transfer rate further comprises:

decreasing the cell transfer rate in response to the occupancy level of the simulation buffer rising above an upper threshold; and increasing the cell transfer rate in response to the occupancy level of the simulation buffer falling below a lower threshold.

5. The method of claim 4, wherein:

increasing the cell transfer rate comprises:

comparing a current occupancy level of the simulation buffer to the lower threshold; and transmitting an increase transmission rate signal to the network source unit in response to the occupancy level of the simulation buffer falling below the lower threshold; and decreasing the cell transfer rate comprises:

comparing a current occupancy level of the simulation buffer to the upper threshold; and transmitting a decrease transmission rate signal to the network source unit in response to the occupancy level of the simulation buffer rising above the upper threshold.

6. The method of claim 1, wherein acquiring the connection availability information further comprises transmitting a status cell along the connection and storing in the status cell the connection availability information.

7. The method of claim 6, wherein acquiring connection availability information further comprises:

determining a threshold priority level for each network node defined along the network connection, the threshold priority level being used when accepting or discarding information cells received by each node;

computing a worst-case threshold priority level as either a minimum or a maximum of the threshold priority levels determined for the nodes; and storing the worst-case threshold priority level as the connection availability information in the status cell.

8. The method of claim 1, wherein:

simulating the connection availability information further comprises transmitting a simulation cell to the simulation buffer contemporaneously with each transmission of an information cell from the network source unit; and regulating the transfer rate of information cells further comprises regulating the transfer rate in response to a threshold number of simulation buffer address locations occupied by simulation cells.

9. The method of claim 1, wherein:

simulating the connection availability information further comprises transmitting a simulation cell to the simulation buffer at a rate substantially equal to the transfer rate of information cells transmitted from the network source unit; and regulating the transfer rate of information cells further comprises regulating a rate at which simulation cells are removed from the simulation buffer.

10. The method of claim 1, wherein:

acquiring connection availability information further comprises determining a worst-case allowable priority level at intermediary nodes defined along the network connection, the worst-case allowable priority level indicative of a probability of information cell acceptance by the intermediary nodes;

simulating the connection availability information further comprises transmitting a simulation cell to the simulation buffer at a rate substantially equal to the transfer rate of information cells transmitted from the network source unit; and regulating the transfer rate of information cells further comprises regulating removal of simulation cells from the simulation buffer at a rate proportional to the worst-case allowable priority level.

11. A method of adjusting a transmission rate of information cells transmitted over a network connection, comprising:

transmitting the information cells over the network connection;

transmitting, substantially contemporaneously with each information cell transmission, a simulation cell to a simulation buffer;

determining a typical threshold priority level for the network nodes defined along the network connection, the typical threshold priority level being used when accepting or discarding information cells received by a typical network node;

removing simulation cells from the simulation buffer at a rate related to the typical threshold priority level; and adjusting the transmission rate of the information cells in response to an occupancy level of the simulation buffer.

12. The method of claim 11, wherein the occupancy level of the simulation buffer is indicative of a level of bandwidth available on the network connection.

13. The method of claim 11, wherein adjusting the transmission rate of the information cells further comprises:

decreasing the information cell transmission rate in response to an occupancy level of the simulation buffer rising above an upper threshold; and increasing the information cell transmission rate in response to the occupancy level of the simulation buffer falling below a lower threshold.

14. The method of claim 11, wherein determining the typical threshold priority level for the network nodes further comprises transmitting a status cell along the connection and storing in the status cell information indicative of the typical threshold priority level.

15. The method of claim 11, wherein removing simulation cells from the simulation buffers further comprises removing simulation cells from the simulation buffer at a rate proportional to the typical threshold priority level.

16. A system for adjusting a transmission rate of information cells transmitted over a network connection, a plurality of network nodes defined along the network connection, the system comprising:

a source unit that transmits the information cells and a status cell over the network connection, the source unit transmitting a simulation cell to a simulation buffer substantially contemporaneously with each information cell transmission; and a destination unit that receives the information cells and the status cell transmitted over the network connection, and transmits the status cell back to the source unit;

wherein the source unit removes simulation cells from the simulation buffer in response to connection bandwidth availability information stored in the status cell, and adjusts the transmission rate of the information cells transmitted over the connection in response to an occupancy level of the simulation buffer.

17. The system of claim 16, wherein the simulation buffer is coupled to a cell output enable circuit which receives the status cell from the destination unit and adjusts a rate of simulation cell removal from the simulation buffer in response to the connection bandwidth availability information stored in the status cell.

18. The system of claim 17, wherein the cell output enable circuit transmits one of a plurality of pulse trains to the simulation buffer in response to the connection bandwidth availability information stored in the status cell, each of the pulse trains having a frequency associated with a preselected rate at which simulation cells are removed from the simulation buffer.

19. The system of claim 16, wherein the source unit removes simulation cells from the simulation buffers at a rate related to a typical threshold priority level for the network nodes, the typical threshold priority level being used when accepting or discarding information cells received by a typical network node.

20. The system of claim 16, wherein the network connection constitutes a nominal bit rate connection.

* * * * *